United States Patent
Hanks

(10) Patent No.: US 11,574,279 B2
(45) Date of Patent: *Feb. 7, 2023

(54) PARCEL PROCESSING SYSTEM AND METHOD

(71) Applicant: One Stop Mailing LLC, Bensenville, IL (US)

(72) Inventor: Gina Marie Hanks, Carol Stream, IL (US)

(73) Assignee: One Stop Mailing LLC, Bensenville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,035

(22) Filed: Jul. 26, 2021

(65) Prior Publication Data

US 2021/0350311 A1 Nov. 11, 2021

Related U.S. Application Data

(63) Continuation of application No. 16/442,977, filed on Jun. 17, 2019, now Pat. No. 11,074,541, which is a continuation of application No. 14/709,669, filed on May 12, 2015, now Pat. No. 10,346,788, and a continuation of application No. 14/622,286, filed on Feb. 13, 2015, now Pat. No. 10,339,489, which is a continuation of application No. 14/622,286, filed on Feb. 13, 2015, now Pat. No. 10,339,489.

(51) Int. Cl.
*G06Q 30/00* (2012.01)
*G06Q 10/08* (2012.01)
*G06Q 30/04* (2012.01)

(52) U.S. Cl.
CPC .......... *G06Q 10/083* (2013.01); *G06Q 30/04* (2013.01)

(58) Field of Classification Search
CPC ............................ G06Q 10/083; G06Q 30/04
See application file for complete search history.

(56) References Cited

U.S. PATENT DOCUMENTS

| | | | |
|---|---|---|---|
| 5,070,463 | A | 12/1991 | Schuricht et al. |
| 5,153,842 | A | 10/1992 | Dlugos, Sr. et al. |
| 5,340,968 | A | 8/1994 | Watanabe et al. |
| 5,729,459 | A | 3/1998 | Brandien et al. |
| 5,995,950 | A | 11/1999 | Barns-Slavin et al. |
| 3,046,304 | A1 | 10/2011 | Bleumer |

(Continued)

FOREIGN PATENT DOCUMENTS

WO 0046728 A2 8/2000

OTHER PUBLICATIONS

Choi et al., "An Experimental Testbed for Parcel Handling with RFID Technology", International Conference Advanced Communication Technology, 2006, pp. 321-326.

(Continued)

*Primary Examiner* — Rajesh Khattar
(74) *Attorney, Agent, or Firm* — Thompson Coburn LLP; Benjamin L. Volk, Jr.

(57) ABSTRACT

A parcel processing system configured to support automated parcel processing. For example, the system can be configured to select a permitted shipping service level from among the plurality of permitted shipping service levels based on a plurality of rules, control the sorting of the parcel into one of a plurality of shipping containers, and bill customers.

20 Claims, 26 Drawing Sheets

(56) References Cited

U.S. PATENT DOCUMENTS

| | | |
|---|---|---|
| 10,339,489 B2 | 7/2019 | Hanks |
| 10,346,788 B2 | 7/2019 | Hanks |
| 11,074,541 B2 | 7/2021 | Hanks |
| 2001/0034608 A1 | 10/2001 | Gendreau |
| 2002/0032573 A1 | 3/2002 | Williams et al. |
| 2002/0111886 A1 | 8/2002 | Chenevich et al. |
| 2002/0123957 A1 | 9/2002 | Notarius et al. |
| 2003/0009351 A1 | 1/2003 | Wade |
| 2003/0105704 A1 | 6/2003 | Sundel |
| 2004/0030572 A1 | 2/2004 | Campbell et al. |
| 2004/0054552 A1 | 3/2004 | Amonette et al. |
| 2004/0167991 A1 | 8/2004 | Stowe et al. |
| 2004/0215480 A1 | 10/2004 | Kadaba |
| 2004/0254808 A1 | 12/2004 | Bennett et al. |
| 2005/0038758 A1 | 2/2005 | Hilbush et al. |
| 2005/0055287 A1 | 3/2005 | Schmidtberg et al. |
| 2005/0149373 A1 | 7/2005 | Amling et al. |
| 2005/0197892 A1 | 9/2005 | Bilibin et al. |
| 2007/0061260 A1 | 3/2007 | deGroeve et al. |
| 2008/0162381 A1 | 7/2008 | Runstrom et al. |
| 2008/0283586 A1 | 11/2008 | Marks et al. |
| 2009/0146410 A1 | 6/2009 | Uslontsev et al. |
| 2010/0292833 A1 | 11/2010 | Gorp et al. |
| 2011/0022433 A1 | 1/2011 | Nielsen et al. |
| 2012/0030134 A1 | 2/2012 | Campbell et al. |
| 2012/0151533 A1 | 6/2012 | Kandanala et al. |
| 2013/0166470 A1 | 6/2013 | Grala et al. |
| 2014/0279666 A1* | 9/2014 | Lievens ............. G06Q 10/0836 235/375 |
| 2015/0281925 A1 | 10/2015 | Doherty |
| 2016/0140486 A1* | 5/2016 | Tibbs ................... G06Q 10/083 705/330 |
| 2016/0140487 A1* | 5/2016 | Tibbs ................. G06Q 10/0837 705/330 |
| 2018/0060800 A1* | 3/2018 | Robinson ........... G07C 9/00182 |
| 2019/0130349 A1* | 5/2019 | Ferguson ............. G06Q 10/083 |
| 2022/0044190 A1* | 2/2022 | Estill ................... G06Q 10/083 |

OTHER PUBLICATIONS

Ship, Shipping Insight, iShip Solutions, www.iship.com/Solutions.aspx, Copyright 1998-2015.

OSM Worldwide Expedited Parcel Shipping Solutions YouTube video, www.youtube.com/watch?feature=player_embedded&v=3C9z3ONLUaA, Jun. 28, 2013.

Prosecution History for U.S. Appl. No. 14/622,286, now U.S. Pat. No. 10,339,489, filed Feb. 13, 2015.

Prosecution History for U.S. Appl. No. 14/709,669, now U.S. Pat. No. 10,346,788, filed May 12, 2015.

Prosecution History for U.S. Appl. No. 16/442,977, now U.S. Pat. No. 11,074,541, filed Jun. 17, 2019.

* cited by examiner

Figure 2

| Parcel ID (201) | Company (202) | Recipient Name (203) | Address 1 (204) | Address 2 (205) | City (206) | State (207) | Zip Code (208) | Country (209) | Reference (210) |
|---|---|---|---|---|---|---|---|---|---|
| 1234 | XYZ Co. | John Smith | 123 Main St. | Apt 2 | Chicago | IL | 60657 | USA | Overnight |
| 5678 | XYZ Co. | Jane Smith | 345 Main St. | | Chicago | IL | 60603 | USA | |
| 9012 | XYZ Co. | John Doe | 678 Lake St. | Suite 3 | New York | NY | 10025 | USA | Large |
| 3456 | XYZ Co. | Jane Doe | 901 10th St. | | Detroit | MI | 48201 | USA | |

Figure 4

| Parcel ID (401) | Company (402) | Recipient Name (403) | Address 1 (404) | Address 2 (405) | City (406) | State (407) | Zip Code (408) | Country (409) | Cost Center ID (411) | Reference (410) |
|---|---|---|---|---|---|---|---|---|---|---|
| 1234 | XYZ Co. | John Smith | 123 Main St. | Apt 2 | Chicago | IL | 60657 | USA | 40 | Overnight |
| 5678 | XYZ Co. | Jane Smith | 345 Main St. | | Chicago | IL | 60603 | USA | 41 | |
| 9012 | XYZ Co. | John Doe | 678 Lake St. | Suite 3 | New York | NY | 10025 | USA | 52 | Large |
| 3456 | XYZ Co. | Jane DO | 901 10th St. | | Detroit | MI | 48201 | USA | 73 | |

Figure 5

Customer Billing Profile (500)

| Customer ID (501) | Under 1lb Flag for BPM (502) | Override Fees flag (504) | Store full address flag (506) | Calc USPS savings flag (508) | Calc Customer markup flag (510) | Billing cycle (512) | Bill only closed BOLs flag (514) | Delivery confirmation for marketing flag (516) | Delivery confirmation for media mail flag (518) | Delivery confirmation for BPM flag (520) | dimensional weight flag (522) | Fee for small parcel (DIM) (524) | Fee for regular parcel DIM (526) |
|---|---|---|---|---|---|---|---|---|---|---|---|---|---|
| 1234 | yes | no | yes | no | no | month | yes | yes | no | yes | no | | |
| 5678 | no | yes | yes | no | no | week | yes | no | yes | yes | no | | |
| 9012 | no | yes | No | no | no | day | yes | no | yes | No | no | | |
| 3456 | no | no | no | yes | yes | Bi-month | yes | no | no | no | yes | .60 | 1.00 |

Figure 7

Cost Center Client Billing Profile (700)

| Customer ID (701) | Cost Center ID (728) | Under 1lb Flag (702) | Override Fees flag (704) | Store full address flag (706) | Calc USPS savings flag (708) | Calc Customer markup flag (710) |
|---|---|---|---|---|---|---|
| 1234 | 1111 | yes | no | yes | no | no |
| 1234 | 2222 | no | yes | yes | no | no |
| 1234 | 3333 | no | yes | No | no | no |
| 1234 | 4444 | no | no | no | yes | yes |

Figure 8

BOL Billing Profile (800)

| BOL ID (830) | Under 1lb Flag (802) | Delivery confirmation for marketing flag (816) | Delivery confirmation for media mail flag (818) | Delivery confirmation for BPM flag (820) |
|---|---|---|---|---|
| 1234 | yes | yes | no | yes |
| 5678 | no | no | yes | yes |
| 9012 | no | no | yes | No |
| 3456 | no | no | no | no |

Figure 10

Billing Main (1000)

| Overhead Percentage (1031) | Delivery Confirmation Rate (1032) | Billing Cycle Start Time (1033) | Billing Week Start Day (1034) |
|---|---|---|---|
| 0% | $0.23 | Week | Sunday |

Shipping Rate Change Data Structure (1200)

| Rate ID (1235) | Start Date (1236) | End Date (1237) | Fuel Surcharge (1238) |
|---|---|---|---|
| BPM | 11/3/2014 | 11/30/2014 | 3.25 |
| Ground | 11/3/2014 | 11/30/2014 | 6.50 |
| First Class Mail | 11/3/2014 | 11/30/2014 | 3.25 |
| Second Day | 11/3/2014 | 11/30/2014 | 6.50 |
| Small Parcel | 11/3/2014 | 11/30/2014 | 3.25 |
| Parcel | 11/3/2014 | 11/30/2014 | 6.50 |
| Overnight | 11/3/2014 | 11/30/2014 | 6.50 |
| Overnight Priority | 11/3/2014 | 11/30/2014 | 6.50 |
| Media Mail | 11/3/2014 | 11/30/2014 | 3.25 |
| Priority | 11/3/2014 | 11/30/2014 | 3.25 |
| Market Parcel | 11/3/2014 | 11/30/2014 | 3.25 |
| Flat | 11/3/2014 | 11/30/2014 | 3.25 |

Figure 15

| | Index | Description | Included | Customer Column Name | Constant Value |
|---|---|---|---|---|---|
| Set Index | 1 | OSM BOL | ☑ | OSM BOL | |
| Set Index | 2 | Customer BOL Id | ☐ | Customer BOL Id | |
| Set Index | 3 | Cost Center | ☑ | Cost Center | |
| Set Index | 4 | Package Id | ☑ | Package Id | |
| Set Index | 5 | Tracking ID | ☑ | Tracking ID | |
| Set Index | 6 | Processed Date/Time | ☑ | Processed Date/Time | |
| Set Index | 7 | Actual Weight | ☑ | Actual Weight | |
| Set Index | 8 | Billed Weight | ☑ | Billed Weight | |
| Set Index | 9 | Billed Service | ☑ | Billed Service | |
| Set Index | 10 | Zip | ☑ | Zip | |
| Set Index | 11 | Zone | ☑ | Zone | |
| Set Index | 12 | Package Charge | ☑ | Package Charge | |
| Set Index | 13 | Delivery Confirmation Charge | ☑ | Delivery Confirmation Charge | |
| Set Index | 14 | Package/Delcon Charge | ☐ | Package/Delcon Charge | |
| Set Index | 15 | Fuel Charge | ☑ | Fuel Charge | |
| Set Index | 16 | Security Charge | ☑ | Security Charge | |
| Set Index | 17 | Fuel/Security Charge | ☐ | Fuel/Security Charge | |
| Set Index | 18 | Total Charge | ☑ | Total Charge | |
| Set Index | 19 | USPS Comparison | ☐ | USPS Comparison | |
| Set Index | 20 | Savings | ☐ | Savings | |
| Set Index | 21 | Client Mark Up | ☐ | Client Mark Up | |
| Set Index | 22 | File Weight | ☐ | File Weight | |
| Set Index | 23 | DIM Weight | ☐ | DIM Weight | |
| Set Index | 24 | Height | ☐ | Height | |

Accounting Setup
- Domestic Main
- Fuel Surcharges
- Customer Profile
- Cost Center Profile
- BOL Billing Setup
- OSM Rack Rates
- Comparison Rates
- Customer Mark Up
- OSM Base Rates International Main
- Vendor Setup

- Billing Information
- Billing Columns
- Billing Fees
- Export File Setup
- Cost Centers
- Currently Used Rates
- Unused Stored Rates
- Side by Side Rate View

CUSTOMER

Save
Return to Defaults

Figure 16

Service Flags (1600)

| Customer ID (1601) | Standard (1641) | Expedited (1642) | Plus (1643) | Priority mail (1644) | FedEx ground (1645) | FedEx Express (1646) | USPS EVS (1647) | FedEx Smartpost (1648) | FedEx 2 Day (1649) | FedEx Over-night (1650) | FedEx Priority Over-night (1651) | First Class Mail (1652) |
|---|---|---|---|---|---|---|---|---|---|---|---|---|
| 1234 | yes | no | yes | no | no | no | no | yes | no | yes | No | no |
| 5678 | yes | yes | yes | no | no | no | no | no | yes | yes | no | no |
| 9012 | yes | yes | No | no | no | no | no | no | yes | No | no | no |
| 3456 | yes | no | no | yes | yes | yes | yes | no | no | no | yes | yes |

Figure 17

Mail Class Flags (1700)

| Customer ID (1701) | Flat (1755) | Standard Machineable (1756) | Irregular (1757) | BPM (1758) | BPM Flat (1759) | Media (1760) | Marketing (1761) | Flat Rate Box (1762) | Flat Rate Envelope (1763) | First Class (1764) |
|---|---|---|---|---|---|---|---|---|---|---|
| 1234 | yes | no | yes | no | no | no | no | yes | no | yes |
| 5678 | yes | yes | yes | no | no | no | no | no | yes | yes |
| 9012 | yes | yes | No | no | no | no | no | no | yes | No |
| 3456 | yes | no | no | yes | yes | Yes | yes | no | no | no |

Figure 18A

Production Data Structure(1800)

| Customer ID (1801) | Process with File Flag (1866) | Process with File – Ignore Zip Flag (1867) | Use Label Maker Flag (1868) | Print Labels Flag (1869) | Apply Delivery Confirm Flag (1870) | Oversize Flag (1871) | Weight Limit Bitmap – under 1 LB (1872) | Weight Limit Bitmap – over 1 LB (1873) | Intercept Parcels (1874) |
|---|---|---|---|---|---|---|---|---|---|
| 1234 | yes | no | yes | no | no | no | 1 oz-16 oz | 1-15 lbs | no |
| 5678 | yes | yes | yes | no | no | no | 1 oz-16 oz | 1-150 lbs | yes |
| 9012 | yes | yes | No | no | no | no | 4 oz-16 oz | 1-5 lbs | yes |
| 3456 | yes | no | no | yes | yes | Yes | 8 oz-16 oz | 1-5 lbs | no |

Figure 18B

Production Data Structure(1800)

| Customer ID (1701) | Customer Assigned Tracking Number Flag (1875) | Cost Center ID in Barcode Flag (1876) | Cost Center ID in Customer File Flag (1877) | USPS Tracking Event – File Upload flag (1878) | USPS Tracking Event – Close Event flag (1879) | USPS Tracking Event – Ship Event flag (1880) |
|---|---|---|---|---|---|---|
| 1234 | yes | no | yes | no | no | no |
| 5678 | yes | yes | yes | no | no | no |
| 9012 | yes | yes | No | no | no | no |
| 3456 | yes | no | no | yes | yes | Yes |

Customer File Mapping Data Structure (2200)

| Customer ID (1701) | Where to Find Customer ID (1875) | Where to Find Package ID (1876) | Where to Find Weight (1877) | Where to Find address (1878) | Where to Find Zip (1879) | Where to Find country (1880) |
|---|---|---|---|---|---|---|
| 1234 | Column 1 | Column 2 | Column 3 | Column 6 | Column 10 | Column 11 |
| 5678 | Column 2 | Column 1 | Column 3 | Column 4 | Column 5 | Column 6 |
| 9012 | Column 1 | Column 2 | Column 3 | Column 4 | Column 7 | Column 11 |
| 3456 | Column 0 | Column 1 | Column 2 | Column 13 | Column 14 | Column 15 |

PARCEL PROCESSING SYSTEM AND METHOD

CROSS-REFERENCE AND PRIORITY CLAIM TO RELATED PATENT APPLICATIONS

This application is a continuation of U.S. patent application Ser. No. 16/442,977, filed Jun. 17, 2019, entitled "Parcel Processing System and Method", now U.S. Pat. No. 11,074, 541, which is (1) a continuation of U.S. patent application Ser. No. 14/622,286, filed Feb. 13, 2015, entitled "Parcel Processing System and Method", now U.S. Pat. No. 10,339, 489, and (2) a continuation of U.S. patent application Ser. No. 14/709,669, filed May 12, 2015, entitled "Parcel Processing System and Method, now U.S. Pat. No. 10,346,788, which is a continuation of U.S. patent application Ser. No. 14/622,286, filed Feb. 13, 2015, entitled "Parcel Processing System and Method", now U.S. Pat. No. 10,339,489, the entire disclosures of each of which are incorporated herein by reference.

INTRODUCTION

Businesses and individuals send numerous parcels domestically and internationally every year. Most businesses and individuals rely on shipping carriers to send and receive parcels, such as FedEx, UPS, and the United States Postal Service (USPS). However, shipping through these shipping carriers can become expensive, especially for businesses or corporations that regularly or annually ship a relatively large number of parcels.

To help offset the costs associated with parcel shipping, some third party shipping companies have formed, such as the company OSM Worldwide. These third party shipping companies have unique partnerships with the traditional shipping carriers (UPS, USPS, etc.) to offer better shipping rates to their clients who ship in bulk. Such partnerships may provide customers of the third party shipping companies with beneficial contracts that may offset the costs of shipping numerous packages. For example, if a company wishes to send out hundreds of free sample parcels to homes in the greater Chicago area, the company sending samples may use a third party shipper to ship all the parcels. The third party shipper may be able to ship all the parcels for a significantly lower shipping price than by sending samples using the United States Postal Service directly.

Third party shipping companies may provide lower shipping rates than the shipping carriers, but generally, the third party shipping companies still rely on the infrastructure created by the shipping carriers. In other words, third party shipping companies may ultimately rely upon shipping carriers, such as the USPS, to ultimately deliver parcels to recipients. For example, a third party company may drop off a load of parcels to a USPS drop point, and the USPS may deliver the load of parcels to the recipients' addresses.

While third party shipping companies may provide advantageous rates to their customers, routing parcels to the correct drop point, address, shipping carrier, storage container, delivery truck, or any other location requires a great deal of organization, record keeping, and processing to successfully deliver numerous parcels to correct destinations. In addition, a third party shipping company may need a sophisticated accounting system to correctly bill all customers of the third party shipping company. Furthermore, third party shipping companies must interface with shipping carrier systems, customer systems, and potentially other systems. Thus, the third party shipping companies have a need for technology that is able to communicate with other systems, understand requests and changes from such other systems, and do so seamlessly so that all packages in the custody of the third party shipping company reach their ultimate destinations.

It is in view of providing solutions to these technical challenges that the inventors disclose a parcel processing system configured to interface with shipping carriers, track parcels to their ultimate destination, assure that parcels are processed and delivered to the correct destination, and properly bill customers for the service.

In one embodiment, a system for processing a plurality of parcels to be shipped, the parcels including a plurality of scannable parcel identifiers thereon, the system comprises a scanner configured to a scan the parcel identifiers for the parcels; a database in which a plurality of customer profile data structures are stored, each customer profile data structures being associated with a customer, and each of a plurality of the customer profile data structures comprising data indicative of a plurality of permitted shipping service levels for its associated customer; and a processor in cooperation with the scanner and the database, the processor configured to: receive a plurality of the parcel identifiers from the scanner; and for each received parcel identifier, (1) determine a destination for the parcel corresponding to that parcel identifier based on the parcel identifier received from the scanner, (2) determine a delivery time frame for shipping the parcel corresponding to that parcel identifier, (3) determine a customer associated with the parcel corresponding to that parcel identifier, (4) retrieve from the database the customer profile data structure associated with the determined customer, (5) select a permitted shipping service level from the retrieved customer profile data structure based on a plurality of rules applied to the determined destination and the determined delivery time frame, the rules configured to identify for selection which of the permitted shipping service levels is estimated to deliver the parcel to the destination within the delivery time frame at the lowest monetary cost, (6) determine a drop point where the parcel corresponding to that parcel identifier is to be transferred to a shipping carrier based on the selected shipping service level, (7) generate shipping label data for the parcel corresponding to that parcel identifier in accordance with the selected shipping service level, and (8) determine one of a plurality of shipping container each parcel is to be sorted into.

In another embodiment, a method comprises receiving data representing (1) a destination for a parcel to be shipped and (2) a delivery time frame for shipping the parcel; determining a customer associated with the parcel; referencing a customer profile data structure associated with the determined customer, wherein the referenced customer profile data structure comprises data indicative of a plurality of permitted shipping service level for the determined customer; selecting a permitted shipping service level from among the plurality of permitted shipping service levels based on a plurality of rules applied to the received data, the rules operating on the received data to identify which of the permitted shipping service levels is estimated to deliver the parcel to the destination within the delivery time frame at the lowest monetary cost; determining a drop point where the parcel is to be transferred to a shipping carrier based on the selected shipping service level; generating shipping label data for the parcel in accordance with the selected shipping service level; and controlling the sorting of the parcel into one of a plurality of shipping containers based on the determined drop point; wherein the method steps are performed by a processor.

In another embodiment, an apparatus comprises a processor configured to: receive data representing (1) a destination for a parcel to be shipped and (2) a delivery time frame for shipping the parcel; determine a customer associated with the parcel; reference a customer profile data structure associated with the determined customer, wherein the referenced customer profile data structure comprises data indicative of a plurality of permitted shipping service level for the determined customer; select a permitted shipping service level from among the plurality of permitted shipping service levels based on a plurality of rules applied to the received data, the rules operating on the received data to identify which of the permitted shipping service levels is estimated to deliver the parcel to the destination within the delivery time frame at the lowest monetary cost; determine a drop point where the parcel is to be transferred to a shipping carrier based on the selected shipping service level; generate shipping label data for the parcel in accordance with the selected shipping service level; and control the sorting of the parcel into one of a plurality of shipping containers based on the determined drop point.

In yet another embodiment, a computer program product comprises a plurality of processor-executable instructions that are resident on a non-transitory computer-readable storage medium, wherein the instructions are configured for execution by the processor to automatically select a shipping method for a parcel by causing the computer to: receive data representing (1) a destination for a parcel to be shipped and (2) a delivery time frame for shipping the parcel; determine a customer associated with the parcel; reference a customer profile data structure associated with the determined customer, wherein the referenced customer profile data structure comprises data indicative of a plurality of permitted shipping service level for the determined customer; select a permitted shipping service level from among the plurality of permitted shipping service levels based on a plurality of rules applied to the received data, the rules operating on the received data to identify which of the permitted shipping service levels is estimated to deliver the parcel to the destination within the delivery time frame at the lowest monetary cost; determine a drop point where the parcel is to be transferred to a shipping carrier based on the selected shipping service level; generate shipping label data for the parcel in accordance with the selected shipping service level; and control the sorting of the parcel into one of a plurality of shipping containers based on the determined drop point.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 2 illustrates an example data structure representing a customer file.

FIG. 4 illustrates an example data structure representing a customer file containing a cost center identification column.

FIG. 5 illustrates an example customer billing profile data structure of an accounting client profile.

FIG. 7 illustrates an example cost center client billing profile data structure of the accounting client profile.

FIG. 8 illustrates an example bill of lading billing profile data structure of the accounting client profile.

FIG. 10 illustrates an example billing main data structure of the accounting client profile.

FIG. 11 illustrates an example shipping rate change data setup GUI.

FIG. 12 illustrates an example shipping rate change date data structure of the accounting client profile.

FIG. 15 illustrates an example customer bill column mapping GUI.

FIG. 16 illustrates an example service level flags data structure of the production client profile.

FIG. 17 illustrates an example mail class flags data structure of the production client profile.

FIGS. 18A and 18B illustrate an example production data structure of the production client profile.

FIG. 20 illustrates an example ship profile GUI.

FIG. 22 illustrates an example customer file mapping data structure of the production client profile.

DETAILED DESCRIPTION OF EXAMPLE EMBODIMENTS

Figure 1:
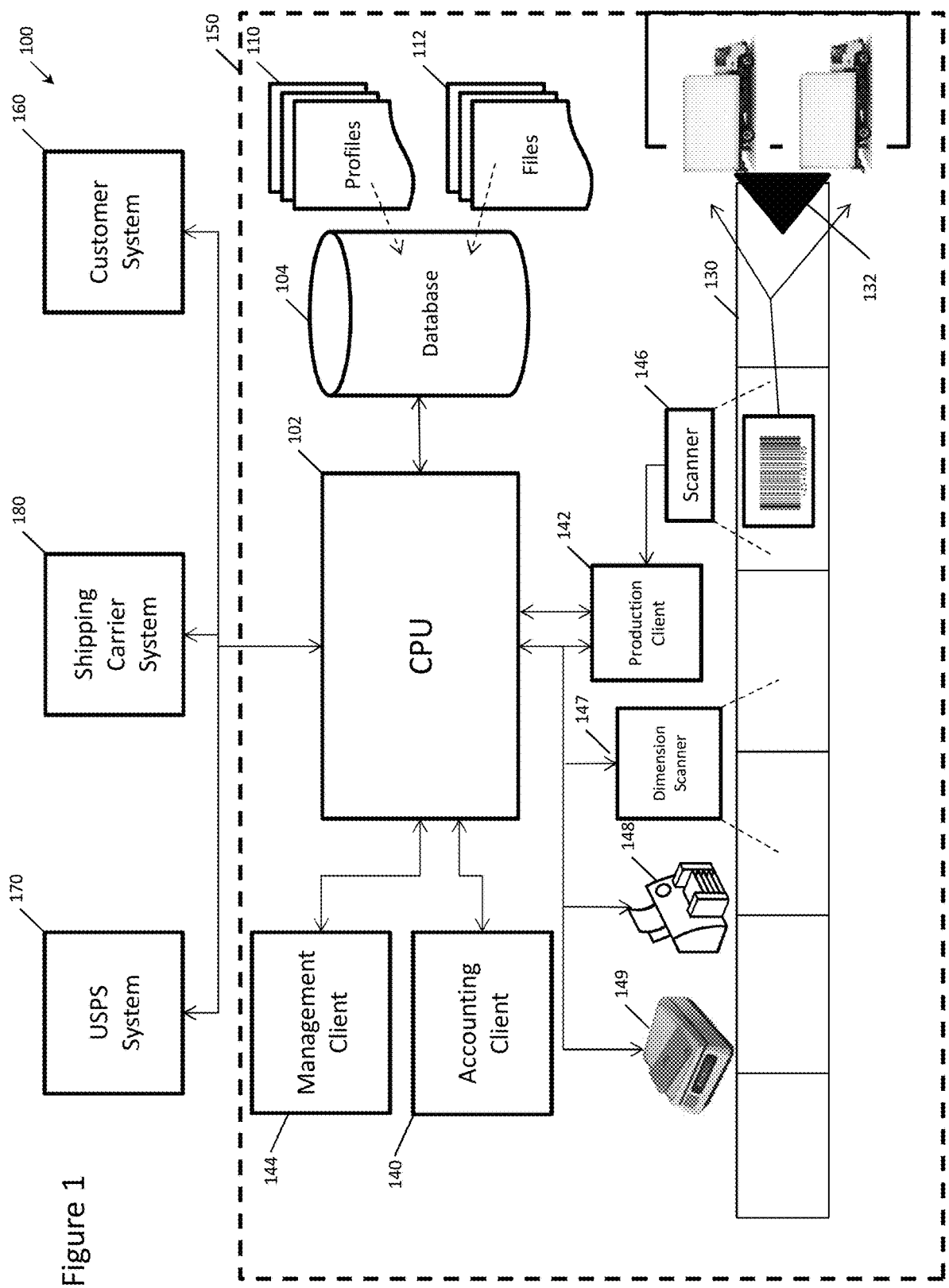
FIG. 1 illustrates an example system diagram of a parcel processing system according to an example embodiment.

Referring to the accompanying drawings in which like reference numbers indicate like elements, FIG. 1 illustrates a parcel processing system 100 according to an example embodiment. Among other components (described later), the parcel processing system 100 comprises a main processing unit 102 (e.g., a CPU and associated memory). The main processing unit 102 electronically connects to most of the components comprising the parcel processing system 100 shown in FIG. 1. The main processing unit 102 creates customer profiles 110, generates or receives customer files 112, makes decisions regarding parcels moving along the conveyer system 130, sorted by mechanical sorters 132, or scanned by employees of the third party shipping company, and accounts for the parcels flowing through the parcel processing system 100. One of the main functions of the main processing unit 102 is record keeping to account for all parcels within a parcel processing facility 150, but the main processing unit is also in charge of determining a route for delivery to ensure that all parcels are delivered to the ultimate destination within an agreed upon time frame.

Determining a route may include determining another sorting facility operated by the third party shipping company located in a part of the country or the world located closer to the parcel's ultimate destination. For purposes of this disclosure, a sorting facility may be a warehouse or other facility operated by the third party shipping company in a location other than the third party shipping company's headquarters. Sorting facilities may receive parcels from customers located in a territory covered by the sorting facility or send or route parcels to shipping carrier or destination addresses. The route determined by the main processing unit 102 may further include determining a drop point where one or more parcels are transferred from the third party shipping company to a shipping carrier. Drop points may be fixed locations where a shipping carrier periodically picks up parcels or a drop point may be a shipping carrier location where the third party shipping company drops off packages (e.g. a post office location or a UPS warehouse). For example, the third party shipping company managing the parcel processing facility 150 may have specialized partnerships with other shipping carriers, such as the USPS, UPS, FedEx, DHL, or any other shipping carrier.

In addition to the functions already described above, the main processing unit 102 may perform accounting functions to bill customers for the parcel processing and shipping. Generating a bill for a customer may include consulting numerous factors, such as a customer relationship, size and weight of the parcels being processed and shipped, distance that the parcel is shipped, whether the parcel is shipped domestically or internationally, whether the parcel is transferred to the USPS or another shipping carrier, and referencing a time-frame for shipping (i.e. overnight shipping, 2 day shipping, 3-5 business day shipping, etc.).

Figure 3:
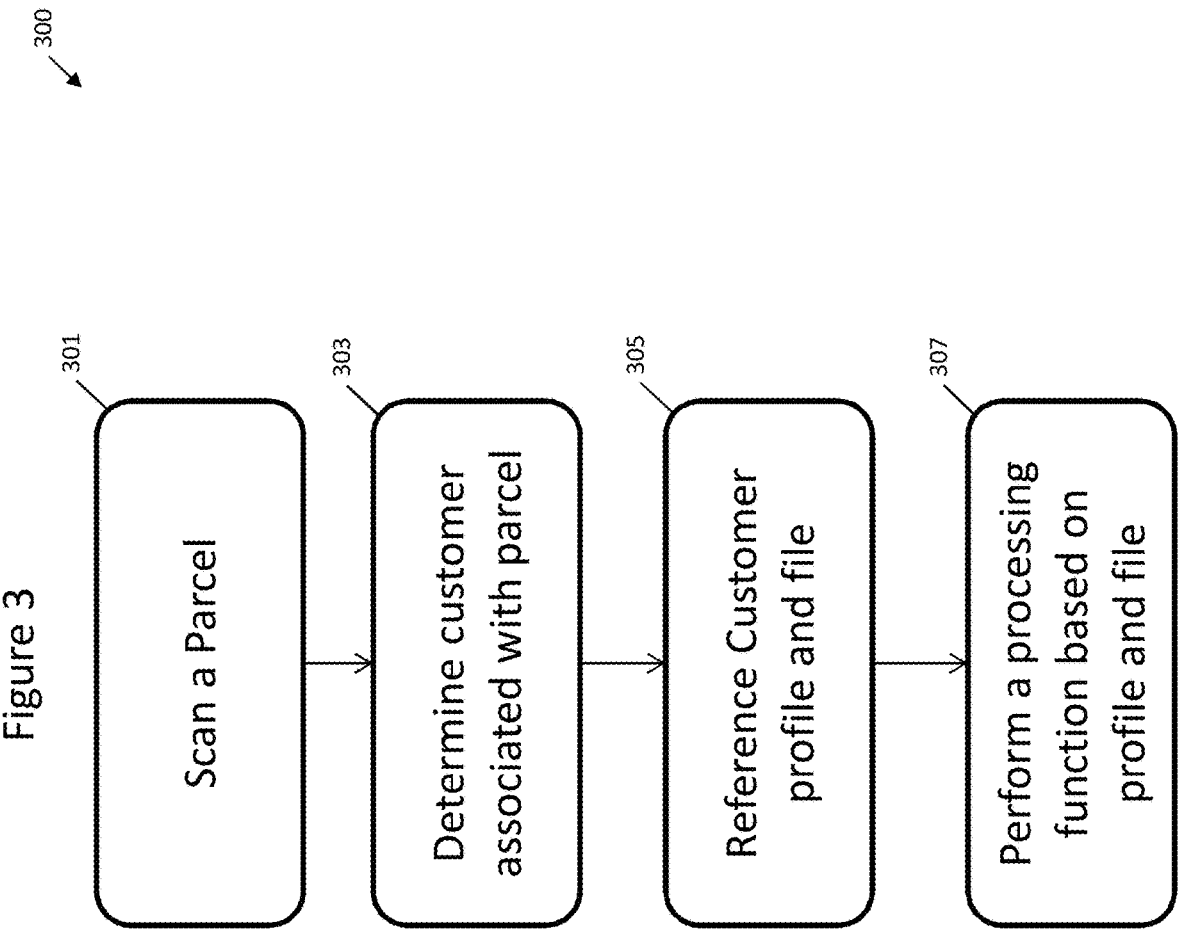
FIG. 3 illustrates an example method performed by a main processing unit.

The main processing unit 102 communicates with other digital computer devices both within the parcel processing facility 150 and external to the parcel processing facility 150. For example, the main processing unit 102 may communicate with the internal computers through a local area network (LAN) and with external computers through a wide area network (WAN). The external computer systems may include customer computer systems 160. Although only one customer computer system 160 is illustrated in FIG. 3, it should be understood that the main processing unit 102 may communicate with a plurality of customer computer systems 160. The external computers may also include server systems managed by shipping carriers, such as the USPS, FedEx, UPS, DHL, etc. In the example shown by FIG. 3, the main processing unit 102 communicates with a USPS computer system 170 and another shipping carrier computer system 180. However, it should be understood that other combinations are possible. The main processing unit 102 may receive data from the shipping carrier computer systems 170/180 or send data to the shipping carrier computer systems 170/180. For example, the main processing unit 102 may track parcels in the custody of the shipping carrier partners by communicating with the shipping carrier computer systems 170/180 and/or the main processing unit 102 may receive updated shipping rate data from the shipping carrier computer systems 170/180. As another example, the main processing unit 102 may receive files from the shipping carrier computer systems 170/180 indicating any manifesting errors. Further, the main processing unit 102 may execute an API to communicate with the shipping carrier computer systems 170/180. The main processing unit 102 may further send a manifest to the shipping carrier computer systems 170 describing a list of parcels transferred to the shipping carriers. A manifest may be a document or file listing all parcels submitted by the third party shipping company to the shipping carrier, and the data associated with the parcels, such as tracking numbers, weights, destination addresses, selected shipping service, etc. Other data communications between the shipping carrier computer systems 170/180 and the main processing unit 102 will be described in further detail below.

The WAN communications may comprise communications made over the Internet. For example, a customer using one of the plurality of customer computers may track a package by entering a package identification number into a website. The customer may also track packages by entering a bill of lading (BOL) number or a customer number, and any parcels associated with either the customer number or BOL number will be displayed to the customer on the customer computer system 160. The main processing unit 102 may further be configured to host a website on the Internet and receive data through the hosted website. In another embodiment, the main processing unit 102 may communicate with a web server specifically configured to host the website. The web server may receive requests for information and pass such requests on to the main processing unit 102. The main processing unit may respond to the requests received by the web server, and the web server may generate a website that provides information responding to the customer request, which may include generating a graphical user interface representing the website hosted by the web server. Alternatively, the web server may communicate directly with the database 104 to respond to customer inquiries made through the website hosted by the web server. For example, a customer may use the website to request tracking on an individual parcel, view a bill, or the customer may manage a customer account, such as changing preferences or a level of service, through the website. The customer may further use the website to generate a new BOL requesting more parcels to be shipped by the third party shipping company.

The main processing unit 102 may comprise a single processor, a group of processors, or a specially-designed server system. The processor comprising the main processing unit 102 is configured to, among other things, receive data identifying a parcel from a plurality of parcels within the parcel processing facility 150, determine a customer associated with the identified parcel, apply customer rules to the parcel by referencing a customer profile, and process the parcel. Processing the parcel may include printing a shipping label, communicating with the shipping carriers to generate a request for service, determining a drop point for the parcel, identifying a shipping container for the parcel, determining the ultimate destination for the parcel, referencing a customer service request file to determine whether the parcel exists within the customer service request file, and numerous other activities, which will be described in more detail herein. The main processing unit 102 also is configured to generate a bill for a customer based on the processed parcels. Generating a bill also requires consulting customer profiles, customer files, another other decision making processes performed by the main processing unit 102.

The customer profiles 110 may exist within any type of file suitable for expressing the customer profile data described herein and associating such customer profile data with a customer, such as a .csv file, an xml file, or a specially-created file-type understood by the main processing unit 102. The customer profiles 110 may be stored in the database 104. The customer profile includes a data structure that stores data indicative of the service agreements made between the operator and the customer. The service agreement indicates which services the third party shipping company may use to deliver the package. Generally the level of service indicates how quickly packages will arrive to a destination. For example, a customer may request that every parcel is shipped using USPS Priority Mail, or some other shipping service provided by the USPS. For another customer, every parcel may be shipped using FedEx Overnight Shipping. The customer profile may indicate other contractual allowances, such as how large of a parcel (weight or dimensions) may be shipped, whether the customer may ship parcels internationally or not, whether the customer may intercept packages en route, a preferred shipping carrier, a customer number, etc. Further, the service agreement defines the shipping rate for each parcel. The shipping rate may depend on the chosen service used to deliver the parcel (i.e. whether the service is overnight or regular service, etc.).

The database 104 stores the customer profiles and other data generated by the main processing unit. The database 104 may also store customer files 112, which may be received from the customer. The customer files may include a manifest of all the parcels included in a shipping order. Some customers may use a format specified by the main processing unit 102, however, some customers may prefer to submit orders in their own format. If the customer uses their own order format, the main processing unit 102 may receive the customer file from the customer and map the information contained in the customer submitted format into the standard customer file format used by the main processing unit 102 when processing parcels through the facility. The standard customer file format may include, a parcel identification number for every parcel included in the customer order, a destination address, a customer number, a drop off point, a tracking number, a sorting facility destination, cost center IDs, parcel weights, and reference fields, or any other piece of information. The customer file 112 may include other information if the parcel is to be shipped internationally.

In some situations, the customer may not submit an electronic customer file with one or more parcels. Instead, the customer may submit a paper BOL, and the BOL may specify the service level, mail classes, and weights of the one or more parcels to be shipped. The BOL may further include information indicating whether the customer is requesting delivery confirmation. This data written on paper may be turned into an electronic form by either manual data entry or optical character recognition and used by the main processing unit when processing packages.

FIG. 2 illustrates an example data structure representing the customer file. As shown in FIG. 2, the customer file data structure may save a plurality of data in a number of columns of a file, such as a .csv file. The customer file may comprise a parcel identification 201, a company name 202, a recipient's name 203, a first destination address line 204, a second destination address line 205, a destination city 206, a destination state 207, a destination zip code 208, a destination country 209, and a reference 210. While only one reference column 210 is shown in the data structure illustrated in FIG. 2, the customer file data structure may include a plurality of reference identification columns 210. Storing data in the reference column(s) 210 is optional. The reference column 210 may be used to store unusual information that is not necessary to deliver the package. The reference column 210 may also store information provided by the customer. For example, the reference column 210 may indicate that the package is particularly large, or the reference column may indicate that this particular parcel will be shipped through expedited shipping while all other parcels in the customer file are shipping by normal priority shipping.

The recipient name 203, first and second address line 204/205, destination city 206, destination state 207, destination zip code 208, and destination country 209 are typical pieces of information in any parcel or letter mailed. These data columns specify the necessary pieces of information to deliver the parcel to the destination address and intended recipient.

The parcel identifier 201 indicates the unique identification code associated with the parcel. When a parcel is scanned, the main processing unit 102 receives a parcel identification code 201 from a scanner 146 scanning the parcel identification code 201, which may be in the form of a bar code or any other unique identifier. The received code may be cross-referenced with the parcel identification column 201 in the customer file. If the main processing unit 102 verifies that a scanned parcel is identified in a customer file, the main processing unit 102 may mark the parcel as processed by changing the value of a flag associated with each row in the data structure, removing the parcel from the database 104, or moving the row associated with the parcel to a new customer file where processed parcels are stored.

Referring again to FIG. 1, the parcel processing facility 150 may include a plurality of client computer devices. It should be noted that a parcel processing facility 150 may include multiple facility locations. In other words, not all client computer devices are necessarily located within the same brick-and-mortar building, and instead the client computer devices may be spread across multiple locations across the country or world. For example, the main processing unit 102 may communicate with an accounting client computer 140, a production client computer 142, and a management client computer 144. Although an accounting client computer 140 and a management client computer 144 are shown as separate devices, both the accounting client computer 140 and the management client computer 144 may both access the accounting and management functions of a software interface for sending commands to the main processing unit 102. However, in some embodiments, management functions, which are described below as being performed by the management client computer 144 may be unavailable to the accounting client computer 140. In other embodiments, the number of functions displayed and made available to users in a GUI may correspond to a username, such that only administrators can see all functions and aspects of the software interface. Meanwhile, accounting team members might be assigned accounting user names that only have access to the accounting features of the software interface. Finally, while FIG. 1 illustrates only one management client computer 144, one accounting client computer 140, and one production client computer 142, the main processing unit 102 may communicate with more or fewer than three client computers depending on the size of the parcel processing facility 150.

A member of the accounting or billing department may interface with the accounting client computer 140 to perform billing functions. For example, the accounting client computer 140 may be used to check billing statements generated by the main processing unit 102. The accounting client computer 140 may also communicate with the main processing unit 102 to create customer profiles that set up billing profiles. For example, a user may use the accounting client computer 140 change or create a new billing data within a customer profile. Such a change may include changing the customer's level of service. Further still, the user may use the accounting client computer 140 to print a bill or send a generated bill to a customer.

The management client computer 144 may perform all of the accounting functions in addition to other functions performed by a manager to monitor efficiency and production. One of the main features available to the management client computer 144 is the ability to view employee performance reports. For example, the management client computer 144 may be able to see how many packages each employee is able to scan and process during a work shift. Employee performance may be compared to other employees, average employee performance, or historical employee performance. In one embodiment, a manager using the management client computer 144 may be able to compare an employee's performance and efficiency in December to the employee's performance and efficiency earlier in the year in April.

The management client computer 144 may also include the ability to take administrative actions on the main processing unit 102. The management client computer 144 may be configured to update the decisions or rules implemented by the main processing unit 102. In addition, the management client computer 144 may update customer profiles and customer files.

Again, the management client computer 144 and the accounting client computer 140 may have similar electrical components and configurations. The permissions allocated may depend not on machine but on username. So, any client computer may transform into a management client computer 144 simply by a manager or an administrator logging into the client computer. FIG. 1 simply depicts a management client computer 144 and an accounting client computer 140 for illustration purposes to illustrate the fact that some machines or user names may have different levels of permissions or configurations, depending on the embodiment.

The production client computer 142 may, in some embodiments, have a different configuration than the management client computer 144 or the accounting client computer 140. The production client computer 142 may perform parcel processing within a warehouse portion of the parcel processing facility 150 or wherever parcels are scanned and processed within the parcel processing facility 150. For example, the parcel processing computer 142 may be wireless for employee convenience as they scan and process parcels through the parcel processing facility 150.

FIG. 1 illustrates a scanner 146, a printer 148, and a scale 149 connected to the production client computer 142, however, in some embodiments the scanner 146 and the production client computer 142 may be the same device. The printer 148 and the scale 149 may further connect to the main processing unit 102, or they may connect only to the production client computer 142 and communicate with the main processing unit 102 indirectly through the production client computer 142. The connection between the production client computer 142 and the scanner 146, the printer 148, and the scale 149 may be either a wired or wireless connection.

The scale 149 may weigh parcels flowing through the parcel processing facility 150. The scale 149 may weigh a parcel and send the parcel's weight to the production client computer 142 or the main processing unit 102. In either embodiment, the main processing unit 102 will ultimately receive the parcel's weight and make decisions based on the received weight. The parcel weight related decisions may include rejecting a parcel for being too heavy or light, calculating a shipping fee based on the weight, or verifying a parcel weight against the listed parcel weight in the customer file.

The system of FIG. 1 further may further include a dimension scanner 147 configured to automatically determine parcel dimensions. The dimension scanner 147 may also connect to the production client computer 142. The dimension scanner 147 may use lasers or sensors to determine parcel dimensions. In some embodiments, an employee may manually determine and entered parcel dimensions into the production client computer 142. In either situation, the main processing unit 102 may receive the dimensions and makes decisions based on the received dimensions. The dimension-related decisions made by the main processing unit 102 may be similar to the weight-related decisions described above. However, the main processing unit 102 may account for weight when rejecting a dimensionally large parcel or charging extra for a dimensionally large parcel. For example, a light parcel (i.e. one pound) that is over 2 feet cubed may be charged extra whereas a heavy parcel (i.e. twenty pounds) may not be charged extra its dimensions are 2 feet cubed. If a customer is not charged for dimensions, the main processing unit 102 may ignore parcel dimensions.

The printer 148 may be configured to print shipping labels or package identifiers at the command of the production client computer 142 or the main processing unit 102. Some parcels may already have a shipping label attached to the parcel based on the needs of the customer. However, some parcels may require a secondary shipping label to deliver the parcel to a drop point or sorting facility within a shipping company's network. Further, the shipping company may require a unique parcel identifier to also be attached to the parcel, and the printer 148 may print such parcel identifiers. Parcel identifiers may include bar codes, QR codes, numbers or codes, or any other scannable identifier.

The scanner 146 identifies parcels by scanning the scannable parcel identifier and sends the parcel identification code to the production client computer 142, which in turn, sends the parcel identification code to the main processing unit 102. In some embodiments, the scanner may send the parcel ID directly to the main processing unit 102. The main processing unit 102 may cross-reference the parcel identification code against parcel identification codes listed in a customer file to verify that the parcel identification code was included in a customer file. The parcel identification code may include a customer number so the main processing unit 102 only references customer files associated with the customer listed in the parcel identification code. The parcel identification code may further include zip code and a cost center identification code.

If the main processing unit 102 is able to verify that the parcel identification code matches a parcel identified in the customer file, the main processing unit 102 updates the database 104 to mark the parcel as scanned and processed. If the customer has not supplied a customer file, the main processing unit 102 may generate a record of the parcel in the database 104. After scanning the parcel, an employee or a conveyer system 130 may move the parcel to the correct sorting area, truck, or storage area. In some embodiments, the parcels may remain stationary during scanning while an employee scans parcel identifiers with a mobile scanner. In the mobile scanner embodiment, the production client computer may report a shipping container to the employee and the employee may physically move the parcel to the identified shipping container. The main processing unit 102 may control the conveyer system 130 to assure that parcels end up in the right area of the parcel processing facility 150. Controlling the conveyer system may control the sorting of parcels to shipping containers, and controlling the conveyer system may include mechanical sorting mechanisms to move parcels to proper shipping containers.

The main processing unit 102 makes numerous decisions about a parcel as the parcel is processed through the parcel processing facility 150. Many of the decisions about the parcel should be performed instantly to prevent any mistakes in parcel processing. The main processing unit 102 references the customer profile data and the customer file data to perform the decision-making processes. Customer profiles store a plurality of information, which may be stored as flags, variable characters, date and time data, bitmap data or other types of data. The customer profile may comprise a CSV file, XML, data, or any other type of data format known to databases and referenced by processors.

FIG. 3 illustrates a basic method 300 performed by the main processing unit 102 as parcels are processed through the parcel processing facility 150. When a parcel arrives at the facility, the parcel is scanned (step 301) and the scanner 146 communicates the data captured by the scanner 146 to the main processing unit 102. After receiving the data sent from the scanner 146, the main processing unit 102 determines the parcel's identification based on at least part of the scanned data. In some embodiments, the scanned data may include customer identification data as well as parcel identification data. If the customer identification data is included within the zip code, the bar code format may be uniform for all customers, or at least the customer identification portion is uniform for all customers. Alternatively, the main processing unit 102 may identify the customer using a bill of lading number entered by a user in the production client computer. In yet another embodiment, the main processing unit 102 may use a parcel ID number to identify the customer associated with the parcel by referencing a customer file. Whether the scanned data includes customer identification data or not, the main processing unit 102 is able to determine a customer associated with the parcel (step 303). The process of identifying a customer associated with a parcel may involve referencing a table or data structure and searching for the determined parcel ID, and using the data structure containing the parcel ID, determining the customer associated with the parcel. Alternatively, the main processing unit 102 may receive an input from a user through the production client computer 142 indicating who is the customer. This input may be in the form of a bill of lading number or a selection of a customer from a list of customer stored in the database 104.

Based on the determined customer associated with the parcel, the main processing unit 102 references a customer profile associated with the determined customer (step 305). The main processing unit 102 may reference the customer profile stored in a database 104. In addition, the main processing unit 102 determines a customer file associated with the parcel or the customer.

After referencing the customer profile and storing the data within the customer profile within memory for use by the main processing unit 102, the main processing unit 102 performs a parcel processing function based on the customer profile and the customer file (step 307). The processing function performed by the main processing unit 102 may include any or all of: generating and printing a shipping label, marking a parcel as processed within the customer file, generating a bill for shipping the parcel, assigning a tracking number to the parcel, performing accounting functions for the customer, determining a shipping method to ship the parcel to its final destination, determining whether a customer's permissions allow them to ship a parcel of the parcel's dimensions or weight, communicating with the USPS or another shipping carrier to deliver the parcel within an agreed upon date, calculating the most economical way to ship the parcel to its final destination (described in more detail below), creating a manifest for the USPS or anther shipping carrier, making sure the zip code associated with the parcel matches the parcel's listed city and state, sorting the parcel to a designated area or container within the parcel processing facility 150, calculating fuel surcharges, determining a drop point or sorting facility where the parcel must be sent to before arriving at its final destination, or any other function. In many situations, the main processing unit 102 performs multiple processing functions per scanned parcel.

When calculating the most economical way to ship a parcel to its destination, the main processing unit 102 finds the lowest cost shipping service that will ship the parcel to its destination within a given time frame. The main processing unit 102 may calculate this most economical shipping method by calculating costs for all shipping services, ranking the calculated costs, and then picking the cheapest shipping services that is permitted by customer and will deliver within time frame. The shipping services may be set by the third party shipping company, and within each shipping service level the main processing unit 102 may make additional decisions such as which carrier to use and which carrier service level to use. Alternatively, the main processing unit 102 may select all shipping services that can deliver the parcel to its destination within a time frame, calculate costs for those services found to deliver the parcel within the time frame, and select the cheapest shipping service of those permitted by customer. In yet another embodiment, the main processing unit may find the most economical shipping method by selecting all shipping services permitted by customer, filtering the allowed shipping services to find those that can deliver within the time frame, then calculating costs for the services that meet the time frame variable, and choosing the service that has the lowest cost to the customer.

Because hundreds or thousands of parcels are processed by the main processing unit 102 every day, the main processing unit 102 must receive and process information from the customer profile quickly and efficiently. Thus, the customer profile must be robust and easily accessible by the main processing unit 102 so that it can efficiently reference the profile and perform all the necessary processing functions for each parcel. The amount of information contained in the customer profile and the number of tables comprising a customer profile may determine the number of processing functions that must be performed by the main processing unit 102.

For example, customers may be divided into different categories, which define different customer profiles and therefore different processing functions for the parcels. A first customer may simply send its own parcels to the parcel processing facility 150 for shipment to recipients. In this situation, the customer is directly billed for each parcel processed and shipped as a single bill. A second customer may receive parcels from multiple underlying clients. A customer that receives parcels from one or more clients may be considered a fulfillment house while the fulfillment house's clients may be considered a cost center. The cost center may not have a relationship with the third party shipping company but instead contracts the fulfillment house to ship parcels. A cost center may be unaware of the relationship the fulfillment house has with the third party shipping company. In other words, multiple cost centers send parcels to be shipped to the fulfillment house, and the fulfillment house then contracts the third party shipping company to ship the parcels supplied by the cost centers. In this scenario, the main processing unit 102 determines not only a customer associated with a parcel, but also the cost center associated with the parcel.

FIG. 4 illustrates how a customer file may change when the main processing unit 102 receives a customer file from a fulfillment house customer. The customer file further includes a cost center ID column 411. The main processing unit 102 uses this additional information to generate unique bills for each cost center. The main processing unit 102 also uses this additional information to determine which cost center is associated with the parcel. FIG. 4 illustrates the cost center IDs as integers saved in the table, but the main processing unit 102 may also save the cost center IDs as the name of a company (i.e. ABC, Inc, or XYZ Co., etc.)

In addition to using the customer file, the main processing unit 102 also references the customer profile. The customer profile comprises numerous tables generated in a database format, such as CSV or XML. The main processing unit 102 references these tables when processing parcels and generating bills. The customer profile may comprise billing profile data and parcel production profile data. The following figures and descriptions describe the data stored by the customer profile.

First, the customer billing profile comprises a plurality of data structures storing information used by the main processing unit 102 to generate a bill. The first data structure comprises data that sets up how a customer should be billed. This data structure comprises billing information that may be entered by an accounting department to bill customers. The accounting processes implemented by the main processing unit 102 may reference this and other customer billing profile data structures when calculating final bills for a customer or a cost center.

The data structure 500 illustrated in FIG. 5 provides data about how the bill will eventually be generated. As shown by the data illustrated in FIG. 5, the customer profile 500 stores data that the main processing unit 102 uses to calculate a final number for a customer bill, and the customer billing profile data structure 500 also stores data the determines how a bill will be presented to a customer. Using this customer billing profile data structure and other data structures that are described below, the main processing unit 102 generates a final bill for a customer for each bill of lading (BOL) or each customer file.

FIG. 5 illustrates a table that represents multiple customer billing profile data structures. Each row of the table illustrated in FIG. 5 represents one customer's billing profile. Thus, each row of FIG. 5 represents a customer billing profile data structure. However, all the customer billing profiles may be saved in the database 104 in tabular format, such as in XML, or CSV formats.

Each customer billing profile data structure may include a customer ID 501, an under 1 pound flag 502, an override fees flag 504, a store full address flag 506, a calculate USPS savings flag 508, a calculate customer markup flag 510, a billing cycle field 512, a bill only closed BOLs flag 514, a delivery confirmation for marketing parcel flag 516, a delivery confirmation for media mail flag 518, a delivery confirmation for bound printed matter (BPM) flag 520, a dimensional weight flag 522, a fee for dimensional small parcel field 524, and a fee for regular parcels field 526. The customer ID 501 may identify each customer, and the customer ID 501 may be in the form of a customer number or a customer text string indicating the customer's name. The main processing unit 102 uses the customer ID 501 to find each customer's billing profile, and the main processing unit 102 may find a customer billing profile data structure after determining which customer ID is associated with a scanned package. The under 1 pound flag 502 indicates whether a BPM parcel found by the scale 149 to be less than one pound should be billed as a small parcel. If the under 1 pound flag 502 is raised, the main processing unit 102 will bill any parcels weighing less than a pound to be billed as a small parcel, otherwise the main processing unit 102 will bill each BPM parcel according to its weight. The override fees flag 504 indicates if a customer is using default fees or unique fees. Some customers may have negotiated lower rates due to high volume of shipping needs, so this flag indicates if the shipping rates are unique to the customer or the default fees. The default fees may be saved in another data structure accessible to the main processing unit 102. The main processing unit 102 may reference yet another data structure associated with the customer profile if the main processing unit 102 bills the customer according to fees unique to the customer. The store full address flag 506 flag determines whether the main processing unit should list the full destination address for each parcel in the bill. The calculate USPS savings flag 508 indicates if the main processing unit 102 should compare the final billed amount to the cost to the customer had the customer directly contracted USPS. This comparison number indicates how much the customer saved using the system and methods described herein. If the flag is raised, the main processing unit 102 calculates the difference between the final billed number and the USPS costs and adds this number to the bill sent to the customer, otherwise these steps are omitted. The calculate customer markup flag 510 indicates whether the main processing unit 102 will calculate the cost and markup for the customer's client. If this flag is raised, the main processing unit 102 calculates the cost to the customer's client and the markup and includes these numbers in the bill sent to the customer, otherwise these steps are omitted. The billing cycle field 512 indicates when the main processing unit 102 should generate a final bill for the customer. For example, FIG. 5 illustrates that a customer may be billed daily, weekly, monthly, or bi-monthly, but the billing cycle field 512 may store any time frame. The bill only closed BOLs flag 514 indicates whether the main processing unit 102 bills parcels as they are processed or to wait until the entire BOL is complete. The delivery confirmation for marketing parcel flag 516 is a flag that indicates whether the main processing unit 102 should add a delivery confirmation for every marketing parcel. While the customer profile may store a default value in the customer billing profile, the production client computer 142 may override this value during parcel processing. The delivery confirmation for media mail flag 518 and the delivery confirmation for BPM flag 520 perform the same function as the delivery confirmation for marketing parcel flag 516 but for media mail and BPM. The dimensional weight flag 522 indicates whether the main processing unit 102 should bill parcels according to dimensional rules (DIM) or weight rules. If the flag is raised, the main processing unit 102 will bill parcels according to a parcel's dimensions, otherwise the main processing unit 102 will bill according to parcel weight. The fee for dimensional small parcel field 524 and the fee for regular parcels field 526 indicate how much the main processing unit 102 should charge for a parcel considered small according to DIM and how much to charge for a parcel that is not considered a small parcel. If the dimensional weight flag 522 is not raised, these values may be empty. The main processing unit 102 only references these values if the dimensional weight flag 522 is raised.

Although not shown, the customer billing profile data structure may also store information such as data indicating the sales representative for the customer, data indicating the date the customer billing profile data structure was created, data indicating the user who created the customer billing profile data structure, data indicating a date when the customer billing profile data structure was updated, data indicating a user who updated the customer billing profile data structure, data indicating a date when the customer was last billed (which the main processing unit 102 may use in conjunction with the billing cycle field 512 to determine when to next send a bill), data indicating a short name for the customer, data indicating a directory to store the bill file after it is created, data indicating an SSH file transfer protocol (SFTP) site address to save the bill file after it is created, data indicating the SFTP login, data indicating the SFTP password, and data indicating the date when the bill file was last exported to SFTP site.

Figure 6:
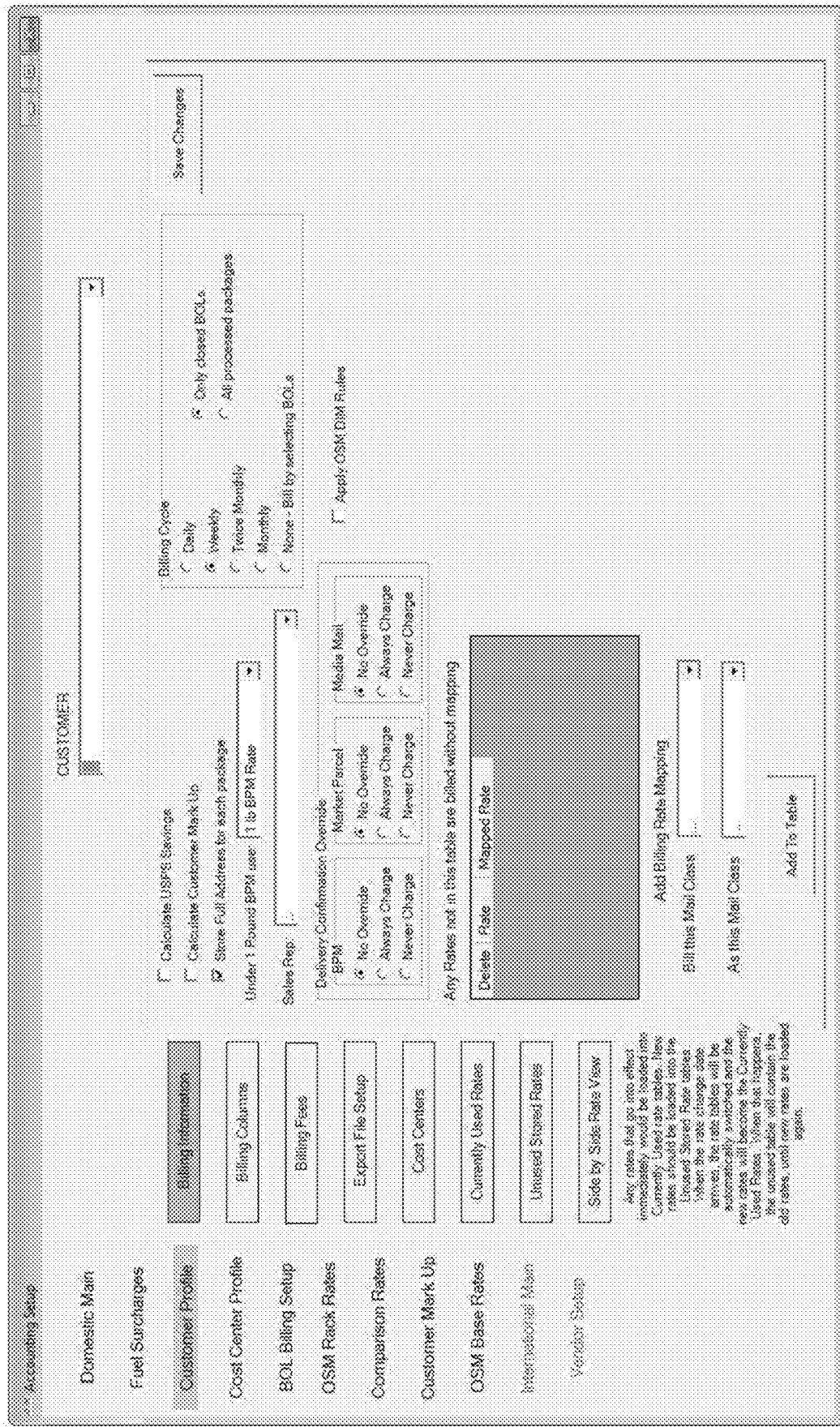
FIG. 6 illustrates an example customer profile setup graphical user interface (GUI).

A user of a client computer, such as the accounting client computer 140, may interface a graphical user interface (GUI) to create the customer billing profile data structure or update the customer billing profile data structure. FIG. 6 illustrates an example GUI for creating the customer billing profile data structures. As shown in FIG. 6, a user may use check mark boxes, radio selection buttons, drop down menus, and mapping tables to create the customer billing profile data structure. The mapping tables may be used to create rates unique to a specific customer. Otherwise, the other selections in GUI shown in FIG. 6 relate to the flags and fields described above for the customer billing profile data structure.

As described above, some customers are considered fulfillment houses or cost centers. Generally, the fulfillment houses would like each cost center to be billed separately. Thus, a bill is created for each cost center when a cost center is properly created. The main processing unit 102 creates cost center billing profile data structure very similarly to the customer billing profile data structure 500 illustrated in FIG. 5. FIG. 7 illustrates a cost center billing profile data structure 700. The main processing unit 102 stores a cost center client billing profile data structure for each cost center so that each cost center may be billed differently. The cost center billing profile data structure 700 contains similar data to the customer billing profile data structure 500. However, the cost center billing profile data structure 700 comprises a subset of the customer billing profile data structure 500, and the cost center billing profile data structure 700 further includes a cost center field 728 that identifies the cost center. This additional field indicates to the main processing unit 102 how a cost center and a customer a related.

The customer ID 701, the under 1 pound flag 702, the override fees flag 704, the store full address flag 706, the calculate USPS savings flag 708, and the calculate customer markup flag 710 fields represent data similarly to the customer ID 701, the under 1 pound flag 502, override fees flag 504, the store full address flag 506, the calculate USPS savings flag 508, and the calculate customer markup flag 510 fields described above with reference to FIG. 5. Further, although not shown, the cost center billing profile data structure may further comprise data indicating the date the cost center billing profile data structure was created, data indicating the user who created the cost center billing profile data structure, data indicating a date when the cost center billing profile data structure was updated, data indicating a user who updated the cost center billing profile data structure, data indicating a short name for the cost center, data indicating a directory to store the bill file after it is created, data indicating an SSH file transfer protocol (SFTP) site address to save the bill file after it is created, data indicating the SFTP login, data indicating the SFTP password, and data indicating the date when the bill file was last exported to SFTP site.

As parcels sent from a customer are scanned, the main processing unit 102 may associate each scanned parcel to a cost center as the parcels are scanned. As a result, the main processing unit 102 may generate multiple different bills even though the scanned parcels are all within the same BOL or container provided by the customer.

Also, the cost center billing profile data structure further maps the cost center ID to billing rates. Each cost center may be mapped to a different rate so that one fulfillment house may have multiple sets of rates that apply to their cost centers. The non-default billing rates may also be applied on a per BOL basis, such as when the customer or cost center negotiated a special rate for one parcel shipping project.

FIG. 8 illustrates a data structure created by the main processing unit 102 if the main processing unit 102 will bill a customer or a cost center for one special BOL. The BOL billing profile data structure comprises an under 1 pound flag 802, a delivery confirmation for marketing parcel flag 816, a delivery confirmation for media mail flag 818, a delivery confirmation for bound printed matter (BPM) flag 520 fields that represent data similarly to the under 1 pound flag 502, the delivery confirmation for marketing parcel flag 516, the delivery confirmation for media mail flag 518, the delivery confirmation for bound printed matter (BPM) flag 520 fields described above with reference to FIG. 5. The BOL billing profile data structure further comprises a BOL ID 830 the stores the BOL number. These special BOL rules would take precedence over any customer profile rules or cost center rules stored in the customer billing profile data structure 500 or the cost center billing profile data structure 700.

The main processing unit 102 may receive a BOL from the production client computer 142 and reference the BOL billing profile to determine how to bill the processed parcels associated with the BOL. The BOL billing profile data structure may further map rates to the BOL like the cost center billing profile data structure.

Figure 9:
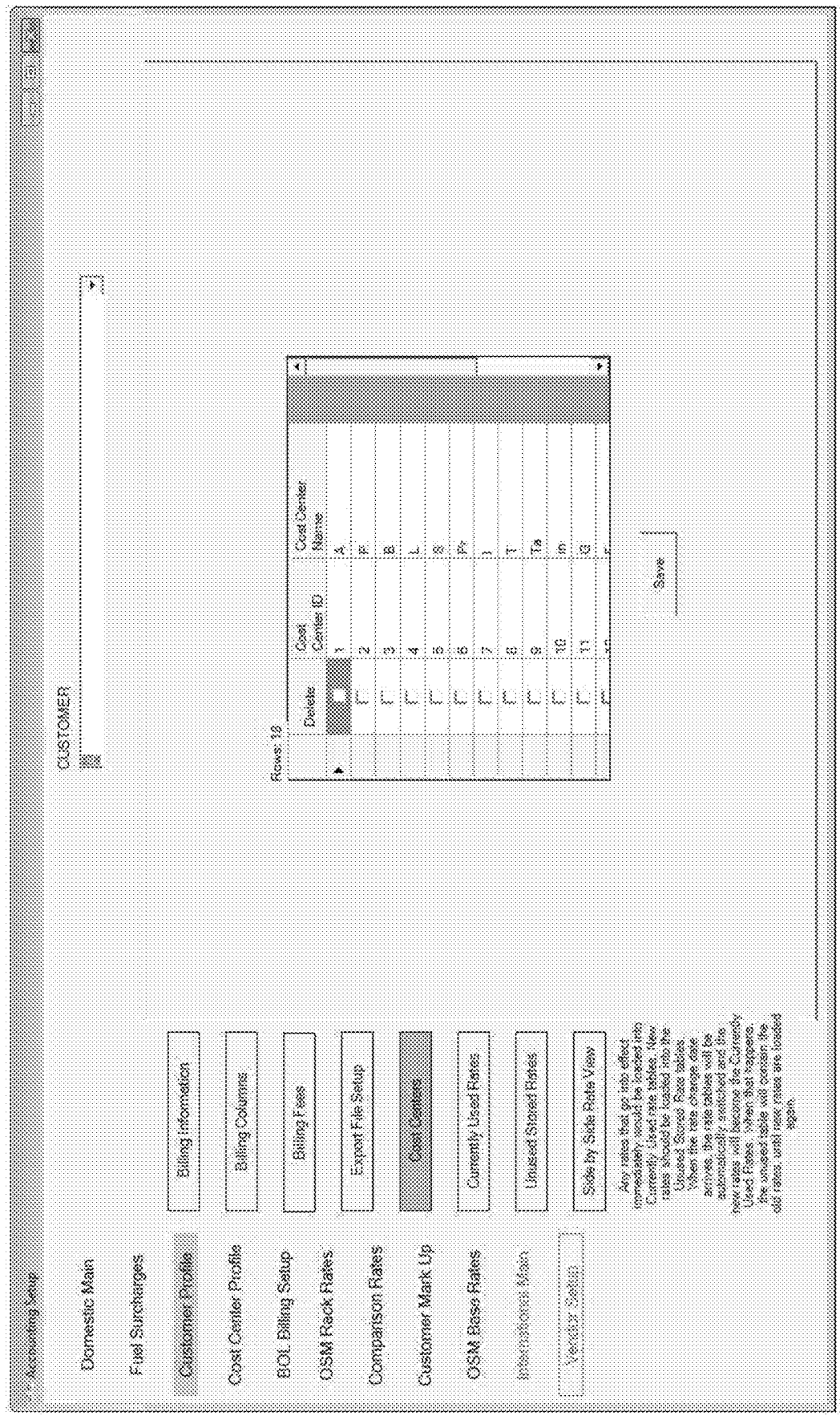
FIG. 9 illustrates an example cost center setup GUI.

FIG. 9 illustrates a GUI for setting up cost centers. As shown in FIG. 9, a fulfillment house may have multiple associated cost centers. The cost centers may be given IDs and names. Cost centers may be deleted if the fulfillment house no longer has a relationship with the cost center. The user may also use the cost center profile button on the left side to set up cost center rates and rules specific for a cost center and the BOL Billing set up button to set up BOL rates and rules specific to a unique BOL.

As alluded to above, the main processing unit 102, in some situations, refers to data structures that have default values or may apply to multiple customers. These default values may be overridden by values stored in a specific customer's billing profile. FIG. 10 illustrates a billing main data structure 1000 storing default values. The billing main data structure 1000 includes an overhead percentage field 1031, a delivery confirmation rate field 1032, a billing cycle time frame field 1033, and a billing week start day field 1034. The overhead percentage field 1031 stores a default overhead percentage if the customer is charged an overhead percentage for all parcels shipped. The delivery confirmation rate field 1032 stores a default cost if the customer requests a delivery confirmation notification. The billing cycle start time field 1033 indicates the default time for the beginning of a new billing cycle, and the billing week start day field 1034 indicates which day of the week begins a new billing cycle.

Figure 11:
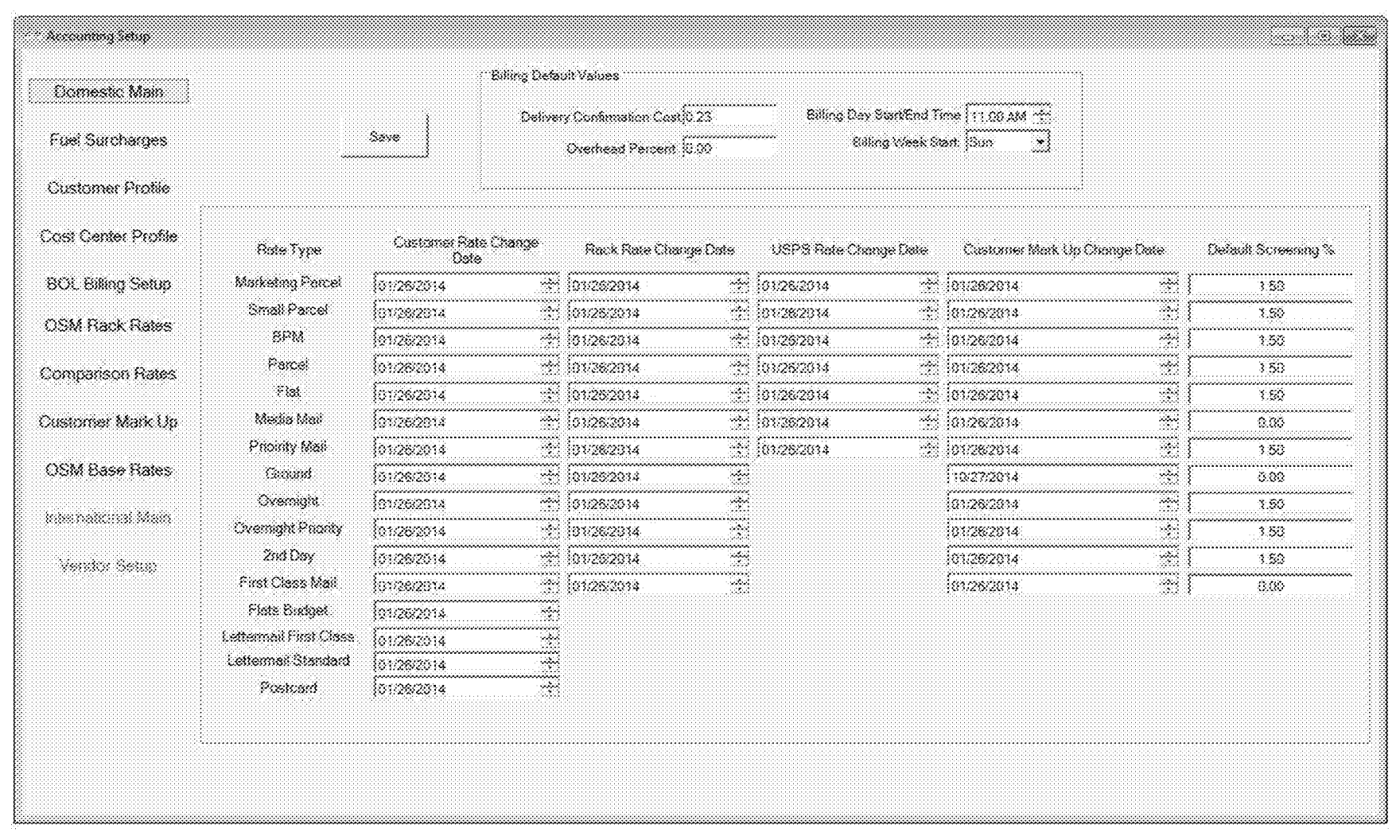

FIG. 11 illustrates the GUI where a user can change these default values. As shown in FIG. 11, a user, such as a user of the accounting client computer 140, can change the delivery confirmation cost, the overhead percentage, the billing cycle start time, and the billing week start day at the top of the GUI. In addition, using this GUI, a user of the accounting client computer 140 may change when rate changes occur. The user of the accounting client computer 140 may change the rate change date on a per service level or mail class basis. Also, the user of the accounting client computer 140 may change the date for rack rate changes, USPS rate changes, customer markup changes, and default screening percentages. These rate changes may generally occur on a yearly basis, but as shown by the GUI in FIG. 11, the rate changes may be specified for any date. Although FIG. 11 illustrates that all the rate changes occur on the same date, the rate changes may occur on different dates depending on the selected option in the drop down list.

While generating a bill, the main processing unit 102 may not only charge the customer according to the weight (or dimensional weight) of a parcel and according to the service level used to ship the parcel, but the main processing unit 102 may further charge a fuel surcharge. The fuel surcharge may depend on the service level of the parcel.

FIG. 12 illustrates a fuel surcharge data structure. Each customer may have an associated fuel surcharge data structure, or these values may be defaults. The fuel surcharge data structure comprises a rate ID field 1235, a start date field 1236, an end date field 1237, and a fuel surcharge field 1238. The rate ID field 1235 identifies the mail class or service level being billed. The start date field 1236 and the end date field 1237 store data that indicates a start date and an end date for the fuel charge. Because fuel costs vary significantly over short periods of time, the time frame between the start and end date may be relatively short, such as a month or less. The fuel charge field 1238 identifies how much a customer will be billed for fuel for each parcel. For example, a customer may be billed an extra 3.25% for bound printed matter and an extra 6.5% for second day parcels. The main processing unit 102 may reference the fuel surcharge data structure 1200 to calculate the fuel surcharge for each parcel. The main processing unit 102 may first determine the fuel surcharge that was valid when the parcel was processed using the date range data, and further use the value specified by the fuel charge field 1238 to calculate the fuel surcharge for each parcel.

Figure 13:
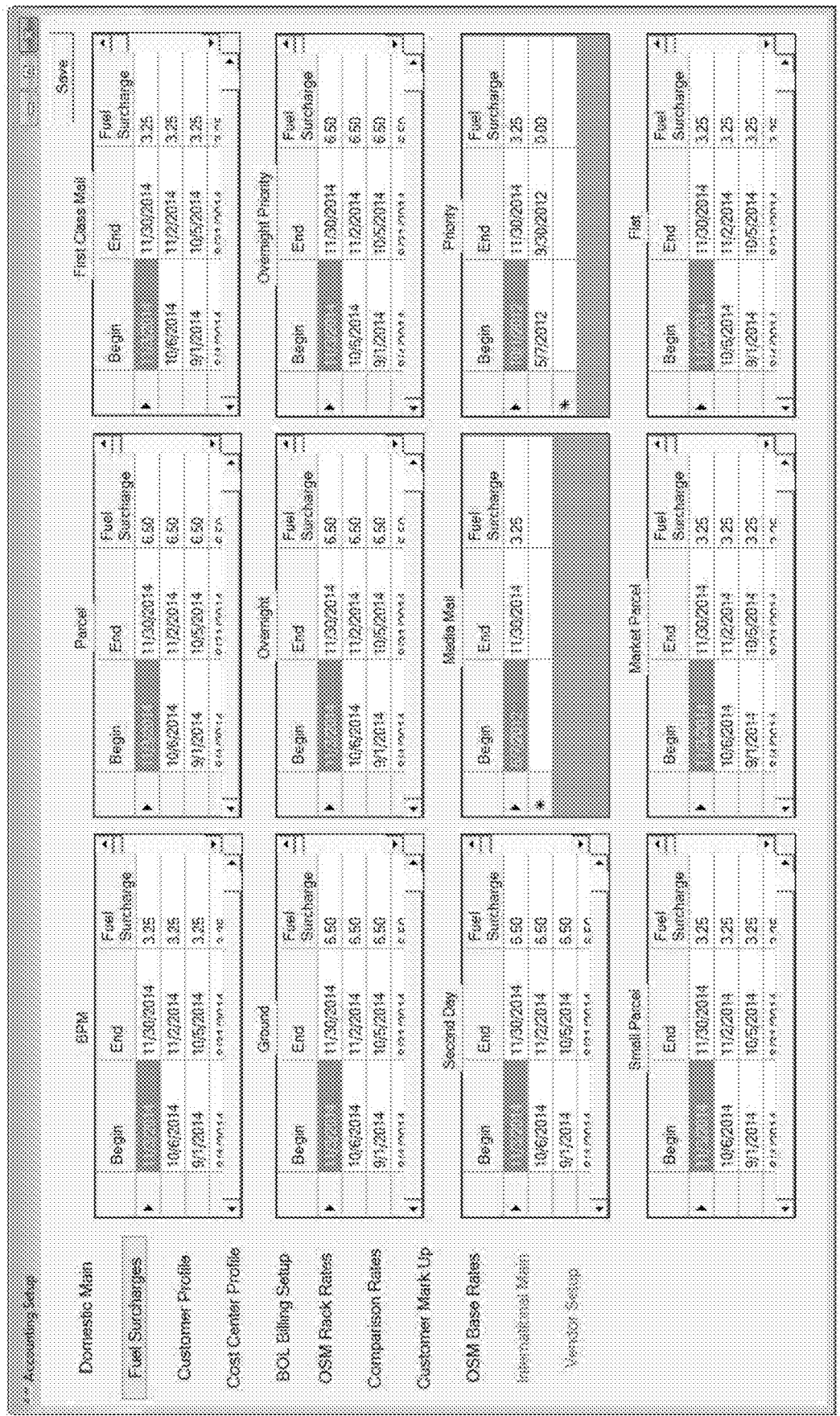
FIG. 13 illustrates an example fuel surcharge setup GUI.

FIG. 13 illustrates a fuel surcharge GUI. Using the GUI, a user of the accounting client computer 140 may change fuel percentage start/end dates and fuel surcharges. The user may change the start/end dates and fuel surcharges for each type of parcel and mail class.

The data structure illustrated in FIG. 12 may store default fuel surcharge values, but the database 104 may also store a similar data structure for each customer if the customer has negotiated different fuel surcharges than the default values. When calculating billed percentages, the main processing unit 102 may first determine if the customer billing profile stores fuel surcharges or screening percentages unique to the customer. Otherwise the customer billing profile may store data indicating that the main processing unit 102 should use the default fuel surcharges and screening surcharges.

Figure 14:
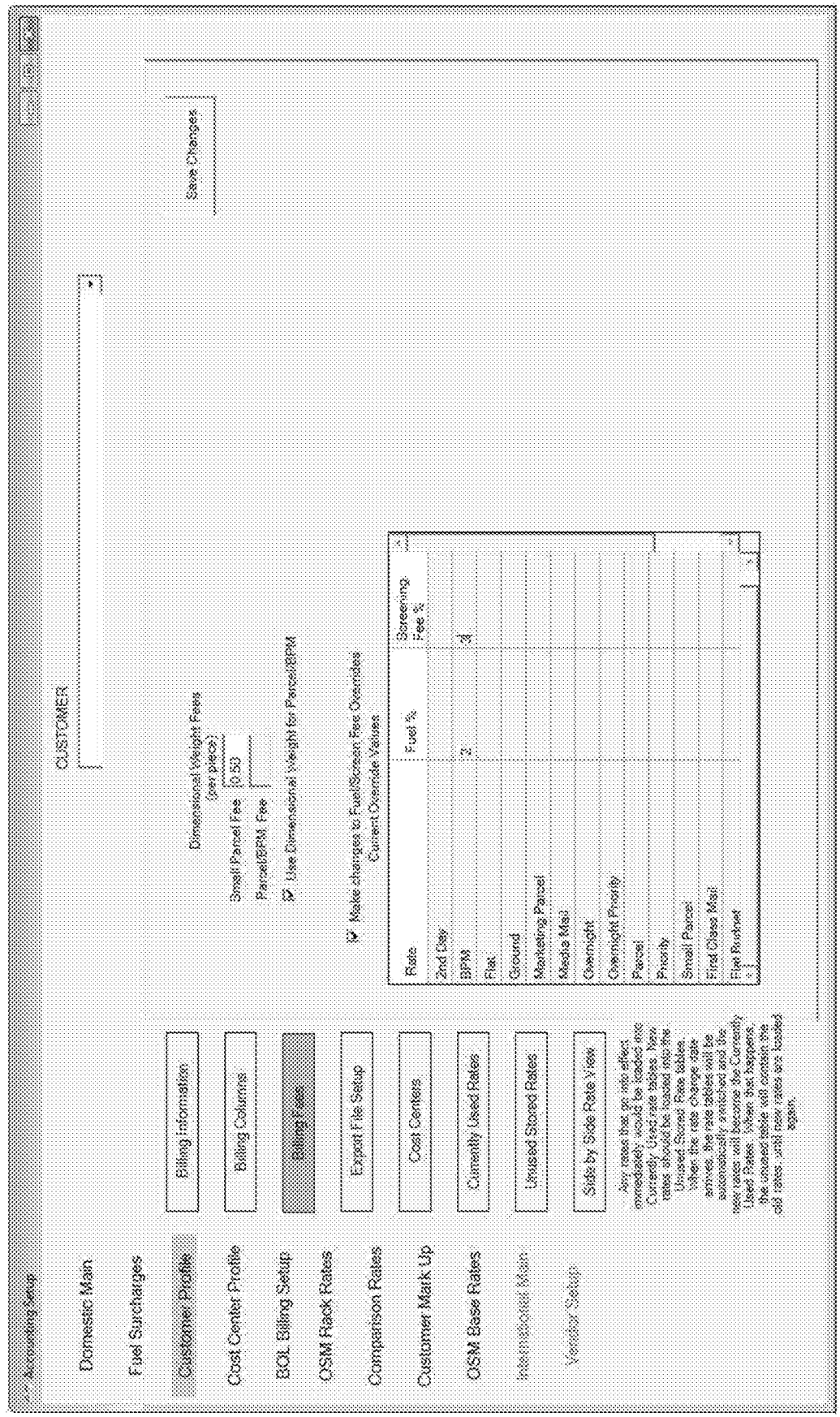
FIG. 14 illustrates an example fuel surcharge and screening fee GUI.

FIG. 14 illustrates a GUI where a user can enter in fuel surcharges and screening percentages unique to a customer. Using the GUI of FIG. 14, the user first selects a customer in the customer drop down menu and begins entering fuel percentages and screening fees for the selected customer. These fees will override default fees.

FIG. 15 illustrates a GUI that allows a user to customize how a bill will look when sent to the customer. The user of the accounting client computer 140 may use this GUI to determine which data values are included as columns in a customer bill, the order as to how the columns are presented, and how the columns are named. A set index column 1590 determines the order of the columns when they are presented in the bill sent to the customer. If the index for a column is set to 1, using index up and down arrows 1592, the column is first displayed, or displayed furthest to the left on a bill. The GUI includes a default column description name column 1594 and a customer column name column 1596. The customer may ask that a column have a special name, and the user of the accounting client computer 140 may enter the column name requested by the customer into the customer column name column 1596. The main processing unit 102 will use default column names for the bill unless the user of the accounting client computer 140 has inputted a new name into the customer column name column 1596 in the GUI. Finally, a customer may want all the information or just a subset of the available information. The user of the accounting client computer 140 may include a column in the bill if the Included checkmark 1598 is clicked. In other words, a user may customize how the data is presented in a bill generated by the main processing unit 102.

The main processing unit 102 may create a data structure within the customer billing profile indicating which columns are included within the bill, the order of the included columns, and the special column names.

Figure 25:
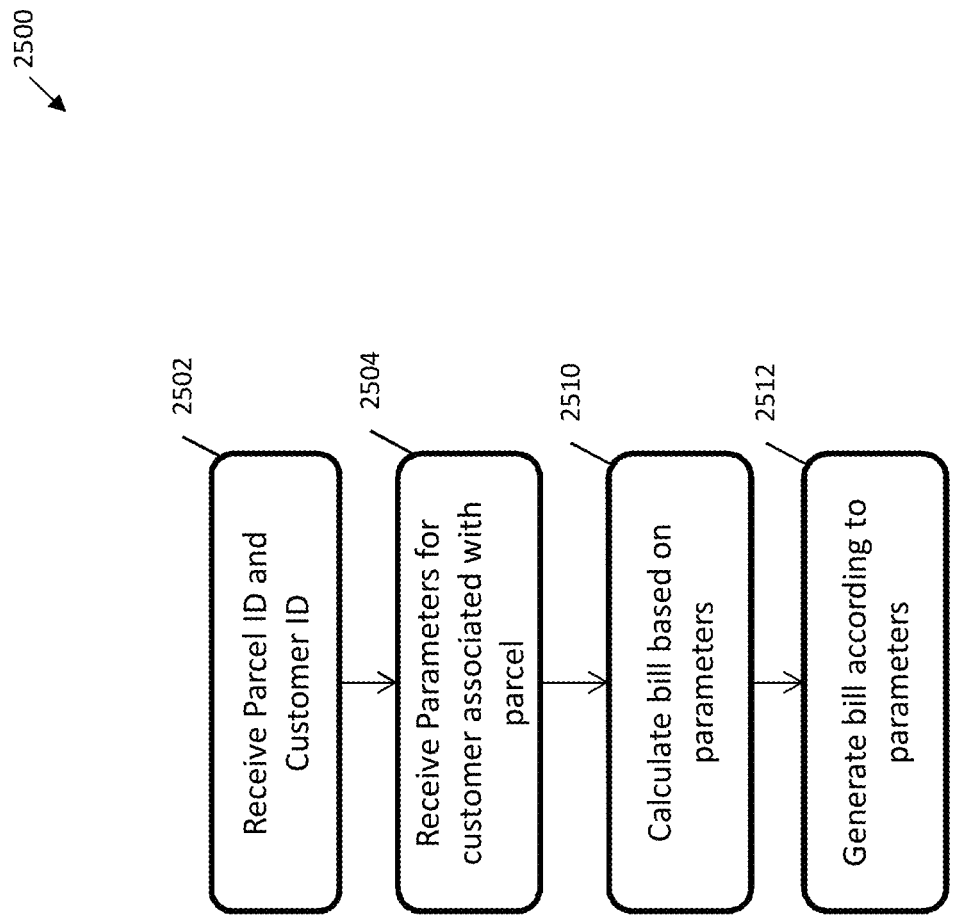
FIG. 25 illustrates the basic process performed by the main processing unit when generating bills for parcels.

FIG. 25 illustrates the basic process performed by the main processing unit 102 when generating bills for parcels. The process 2500 begins when the main processing unit 102 receives a parcel ID and a customer ID number (step 2502). The main processing unit 102 may also receive bill of lading and a cost center ID number too, if they exist. The main processing unit 102 may receive these parameters from the production client computer 142 or the scanner 146. This step may involve the main processing unit 102 determining which customer is associated with the parcel by referencing the parcel ID or a BOL number. Using the identified customer, the main processing unit 102 references billing parameters stored in the accounting customer profile stored in the data base 104 (step 2504). Using the referenced parameters, the main processing unit calculates a bill for the parcel (step 2510). Calculating a bill may include receiving data indicating a service level used to ship the parcel, the weight of the parcel, or other factors described above. Finally, the main processing unit 102 generates a bill according to the customer's bill preferences (step 2512). The processor illustrated in FIG. 25 may be applied to a plurality of parcels for one customer.

By referencing all the data in the various data structures described above, the main processing unit 102 may generate a bill for each customer or cost center according to the rules set by the accounting customer profile data structures. After the bill is created, the main processing unit 102 marks a bill as complete so that a customer is not billed more than once per package.

As mentioned above, the customer profile not only includes billing information data but also data structures used by the main processing unit 102 to make decisions as to how parcels are shipped from the facility to a destination.

FIG. 16 illustrates a service flag data structure 1600 that indicates which services the main processing unit 102 may use to ship a parcel for a particular customer. The service flag data structure 1600 comprises a customer ID 1640, a standard service flag 1641, an expedited service flag 1642, an expedited plus flag 1643, a USPS priority mail flag 1644, a FedEx Ground flag 1645, a FedEx express flag 1646, a USPS EVS flag 1647, a FedEx Smartpost flag 1648, a FedEx 2 Day flag 1649, a FedEx Overnight flag 1650, a FedEx Priority Overnight flag 1651, and a first class mail flag 1652. Each of these flags are representative of a service offered by FedEx, the USPS, another shipping carrier, or by the third party shipping company. These flags indicate whether a customer will allow their package to be shipped using all or some of these services. The main processing unit 102 may only select a shipping service if the customer profile allows it.

The main processing unit 102 may receive shipping requirements for one or more parcels. The main processing unit 102 may receive the shipping requirements from the customer file, or the customer profile may store these shipping requirements. The shipping requirements may indicate the maximum amount of time allotted to the third party shipping company to deliver each parcel (e.g. 1 day, 2 days, 5 days), or the shipping requirements may be in the form of a maximum dollar amount per package (e.g. no more than $5.00 per package). The main processing unit 102 may calculate the cost and time to deliver a parcel according to each shipping service based on the weight or dimensions of the parcel. Furthermore, the main processing unit 102 may calculate the cost and time to deliver a parcel only for the shipping services allowed by the customer profile, although it should be understood that this need not be the case.

For example, when shipping a parcel for the customer "5678", the main processing unit 102 may only calculate the cost and time to deliver the parcel according to standard service 1641, expedited service 1642, plus service 1643, FedEx 2 Day 1649, and FedEx Overnight 1650. The main processing unit 102 will select the service that meets the time requirements at the lowest cost and ship the parcel according to that service. The main processing unit 102 may determine the most economical method of shipping the parcel to the destination within the time frame by referencing saved data stored in the database 104 that identifies either the average time for delivery from the parcel processing facility 150 to the destination or the longest time for delivery from the parcel processing facility 150 to the destination. The main processing unit 102 chooses a service level based on a customer's request. That is, the system selects the carrier and service level based on rules for that service, wherein the rules reference service level, weight, mail class, and zip code. The system then applies the programmed rules. The rules may change as agreements with carriers change. The main processing unit 102 also uses delivery time ranges stored for each service. Using this data, the main processing unit 102 may first determine which service levels meet the time frame criteria. After generating the list of service levels that meet the time frame criteria, the main processing unit 102 may calculate the cost for each service level that meets the time frame criteria and select the service having the lowest shipping cost. The time frame requirement data may depend on the time of day the main processing unit 102 is calculating the time to delivery. For example, if the main processing unit calculates the time to delivery in the morning may differ from the time to delivery calculated in the afternoon or evening.

As another example, the customer may require a parcel to be delivered to a location within three days. For many zip codes, the main processing unit 102 may determine that a standard service will result in the parcel being delivered within three days and for the lowest cost. However, some locations, as determined by zip code, will not receive a parcel within three days using standard service (e.g. a remote location far from a local post office or a location only accessible by land or sea, such as Hawaii). Thus, the main processing unit 102 may determine that USPS Priority Mail is necessary to deliver the parcel within three days. The cost may increase, but the main processing unit 102 meets the requirements of the customer first and foremost.

Sometimes errors may occur while generating labels and shipping parcels. If an error occurs, the customer service representative then notifies the customer that their shipping requirement cannot be met and discusses other options, such as a more expensive method or asking the customer to lower their delivery time requirement. The main processing unit may further suggest the most economical method of shipping the parcel within the time frame. The notification may also include data indicating the time frame for the parcel to be delivered. A user of the management client computer 144 may override a customer requirement for a single parcel or for all parcels in the BOL.

Like the data structure shown in FIG. 16, a mail class data structure 1700, which is illustrated in FIG. 17, stores data that indicates which mail classes the main processing unit 102 may select for a customer as the main processing unit 102 makes decisions regarding parcels. The mail class data structure comprises a customer ID 1740, a flat parcel flag 1755, a standard machinable parcel flag 1756, an irregular parcel flag 1757, a BPM flag 1758, a flat BPM flag 1759, a media mail flag 1760, a marketing parcel flag 1761, a USPS Flat Rate box flag 1762, a USPS Flat Rate Envelope flag 1763, and a first class parcel flag 1764. Each of these flags are representative of a mail class. These flags indicate whether a customer will allow their package to be shipped using all or some of these mail classes. The main processing unit 102 may only select a mail class if the customer profile allows it, or if the customer profile has a flag raised for the mail class selected by the main processing unit 102. Also, a BOL may override these values and specify only one allowed mail class for all parcels in the BOL. Further, another data structure (not illustrated) may map which shipping services are compatible with which mail classes or vice versa.

FIGS. 18A and 18B illustrate another data structure that comprises data used by the main processing unit 102 to make decisions regarding packages. FIG. 18B shows a continuation of the same data structure illustrated in FIG. 18A. The production data structure illustrated in FIGS. 18A and 18B comprises a process with file flag 1866, a process with file—ignore zip flag 1867, a use label maker flag 1868, a print labels flag 1869, an apply delivery confirmation flag 1870, an oversize parcel flag 1871, a weight limit under one pound variable 1872, a weight limit over one pound variable 1873, an intercept parcels flag 1874, a customer assigned tracking number flag 1875, a cost center ID in barcode flag 1876, a cost center ID found in customer file flag 1877, a USPS tracking event for file upload flag 1878, a USPS tracking event for a close event flag 1879, and a USPS tracking event for ship event flag 1880.

The main processing unit 102 uses the process with file flag 1866 to determine if the main processing unit 102 should look within a customer file for the package.

The main processing unit 102 uses the process with file—ignore zip flag 1867 to determine whether the main processing unit 102 should look within a customer file for the package, but the main processing unit 102 should ignore the zip code associated with the package listed in the customer file and instead use the zip code found by scanning the package.

The use label maker flag 1868 indicates to the main processing unit 102 that the customer has used label making software provided by the third party shipping company to print a label for the package before the package was delivered to the third party shipping company.

The print labels flag 1869 indicates to the main processing unit 102 that the main processing unit 102 should generate a shipping label and print the label using the printer 148.

The apply delivery confirmation flag 1870 indicates to the main processing unit 102 whether the main processing unit 102 should apply and bill for delivery confirmation for all parcels submitted by the customer.

The main processing unit 102 references the oversize flag 1871 to determine whether the customer has contracted for oversized parcels to be shipped. The main processing unit 102 may reference this field when an oversized parcel is scanned or weighed by the scanner 146 or scale 149. If the oversized parcel flag 1871 is not raised, the main processing unit 102 will reject the oversized parcel and will not process the oversized parcel.

The main processing unit 102 may use the weight limit (under one pound) variable to determine which parcel weights may be processed by the main processing unit 102. In some embodiments, the weight limit (under one pound) variable is a bitmap variable. For example, customer "1234" has contracted for all weights below 1 pound, but customer "3456" has not. Any packages having a weight not included in this data structure will be rejected by the main processing unit 102.

The main processing unit 102 may use the weight limit (over one pound) variable to determine which parcel weights over a pound may be processed by the main processing unit 102. In some embodiments, the weight limit (over one pound) variable is a bitmap variable. For example, customer "1234" has contracted for all weights between 1 and 15 lbs, and customer "5678" has contracted for packages between 1 and 150 pounds. Any packages having a weight not included in this data structure will be rejected by the main processing unit 102.

The intercept parcels flag 1874 indicates whether the customer has contracted for the ability to intercept parcels while en route to a destination. For example, if a pharmaceutical company sends out drug samples but incorrectly placed the wrong drug samples in the parcel, the pharmaceutical company may request those parcels to be intercepted. Parcel interception may happen within the parcel processing facility 150 or outside. If the parcel to be intercepted is within the parcel processing facility 150, the parcel intercept will be noted in the database 104. Such a notation within the customer file may be sent from the customer or the customer file may have been amended by a user of the accounting client computer 140. For example, a customer may send an email requesting 15 packages to be intercepted. The main processing unit 102 may make a note of the 15 parcels to be intercepted in the customer file after receiving the email or other type of alert. The customer may also make a request to intercept parcels through a web portal hosted by the main processing unit 102 or the web server connected to the main processing unit 102. If the scanner 146 scans a parcel marked to be intercepted, the main processing unit 102 will not process the package. If the parcel has left the parcel processing facility 150, the main processing unit 102 may interface with either the USPS System 170 or the Shipping Carrier system 180 to request the parcel intercept.

The customer assigned tracking number flag indicates whether the customer has assigned their own tracking number before giving the parcels to the third party shipping company. If this flag is raised, the main processing unit 102 will assign the parcel the tracking number assigned by the customer; if not, the main processing unit 102 will assign a unique tracking number generated by the main processing unit 102. If the flag is raised, the main processing unit 102 may confirm that the customer assigned tracking number is valid before accepting the customer assigned tracking number. If the number is found invalid, the main processing unit 102 assigns the parcel a new, valid tracking number.

The cost center ID in customer file flag 1877 indicates whether the cost center identifier is located within the customer file. If this flag is raised, the main processing unit 102 references the customer file to determine the cost center. The cost center ID in barcode 1876 indicates whether the cost center identifier is located within the scanned barcode on the parcel. If this flag is raised the main processing unit 102 determines the cost center ID from the scanned barcode.

The tracking events flags 1878-1880 indicate whether the main processing unit 102 should send a tracking event to the USPS. These tracking events include sending a manifest file to the USPS listing the parcels to be shipped by the USPS, sending a notification on a close event, a parcel arrival event, or sending a notification on a ship event.

Figure 19:
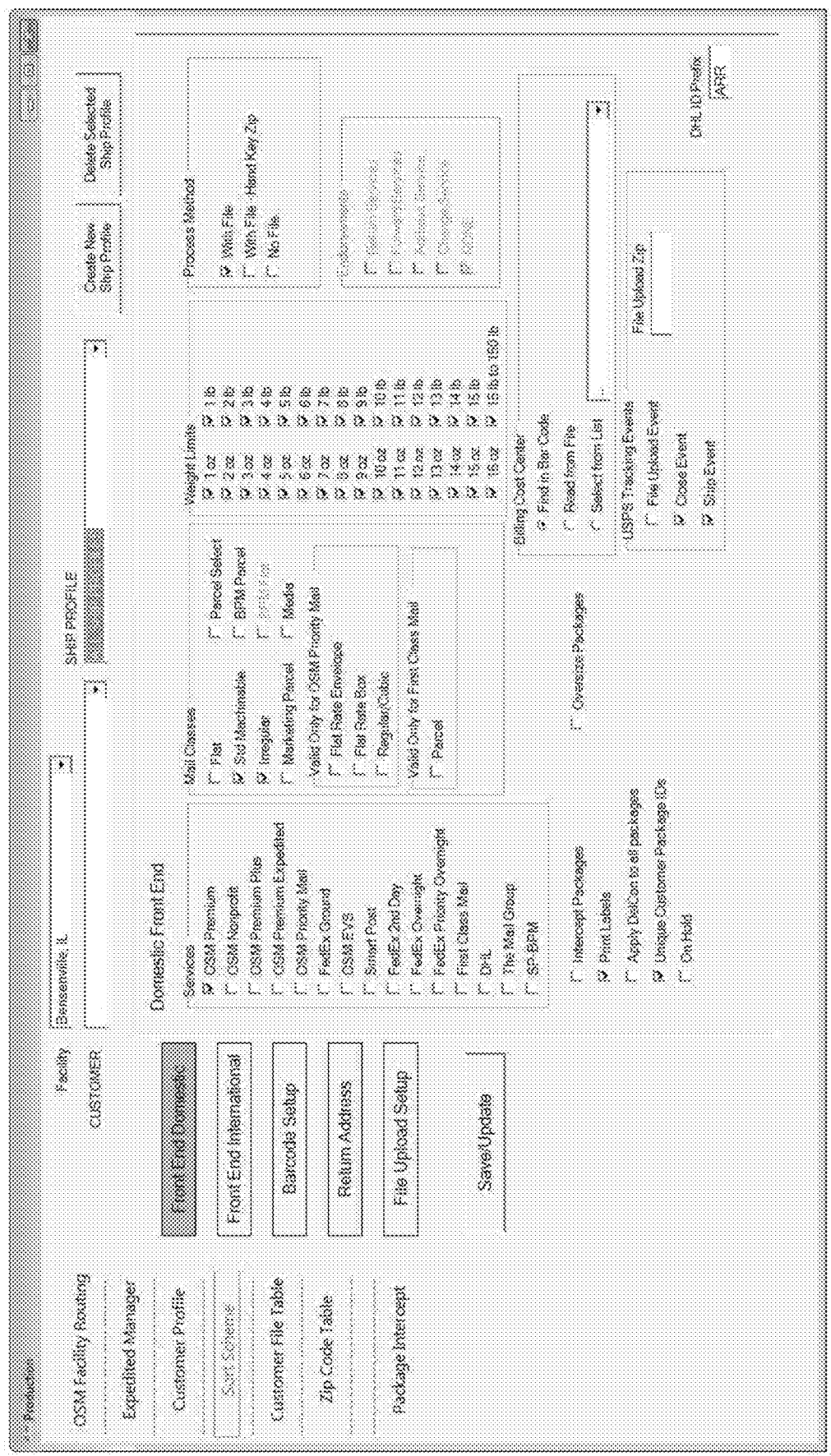
FIG. 19 illustrates an example production client profile setup GUI.

FIG. 19 illustrates a GUI used to by a user to set values for the data production data structure. In the GUI, the user can set which services, mail classes, and weights the main processing unit 102 may use when processing packages. The user may also set values for parcel intercept, delivery confirmation, printing labels, oversized packages, etc.

Figure 20:
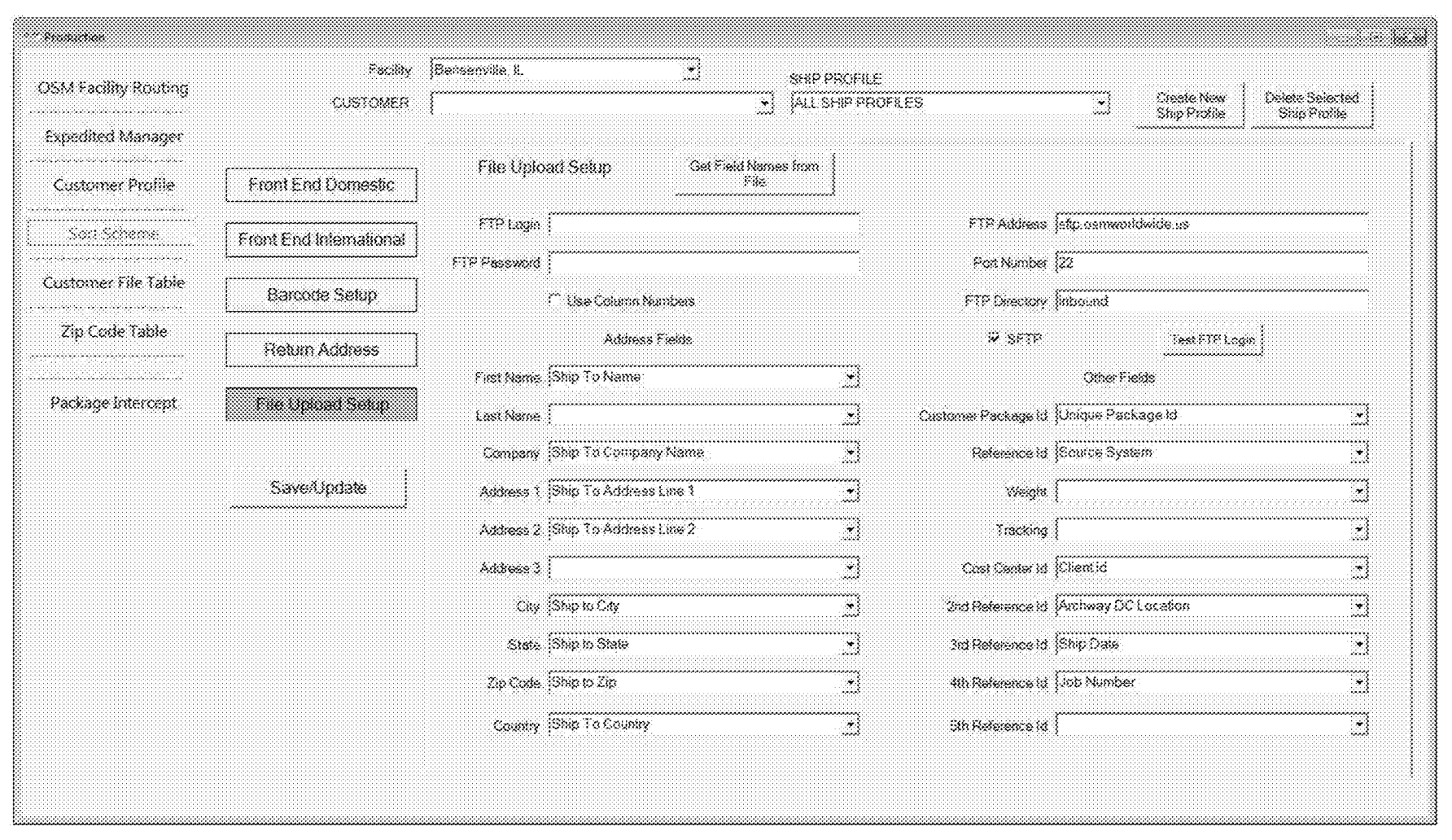

Although not illustrated as a data structure, the customer production profile may further include a return address for all parcels associated with the customer. The return address may be used by the main processing unit 102 to ship parcels that were rejected or intercepted during parcel processing. A user of a client computer may set return address values and also cost center return address values within the GUI illustrated in FIG. 20.

Figure 21:
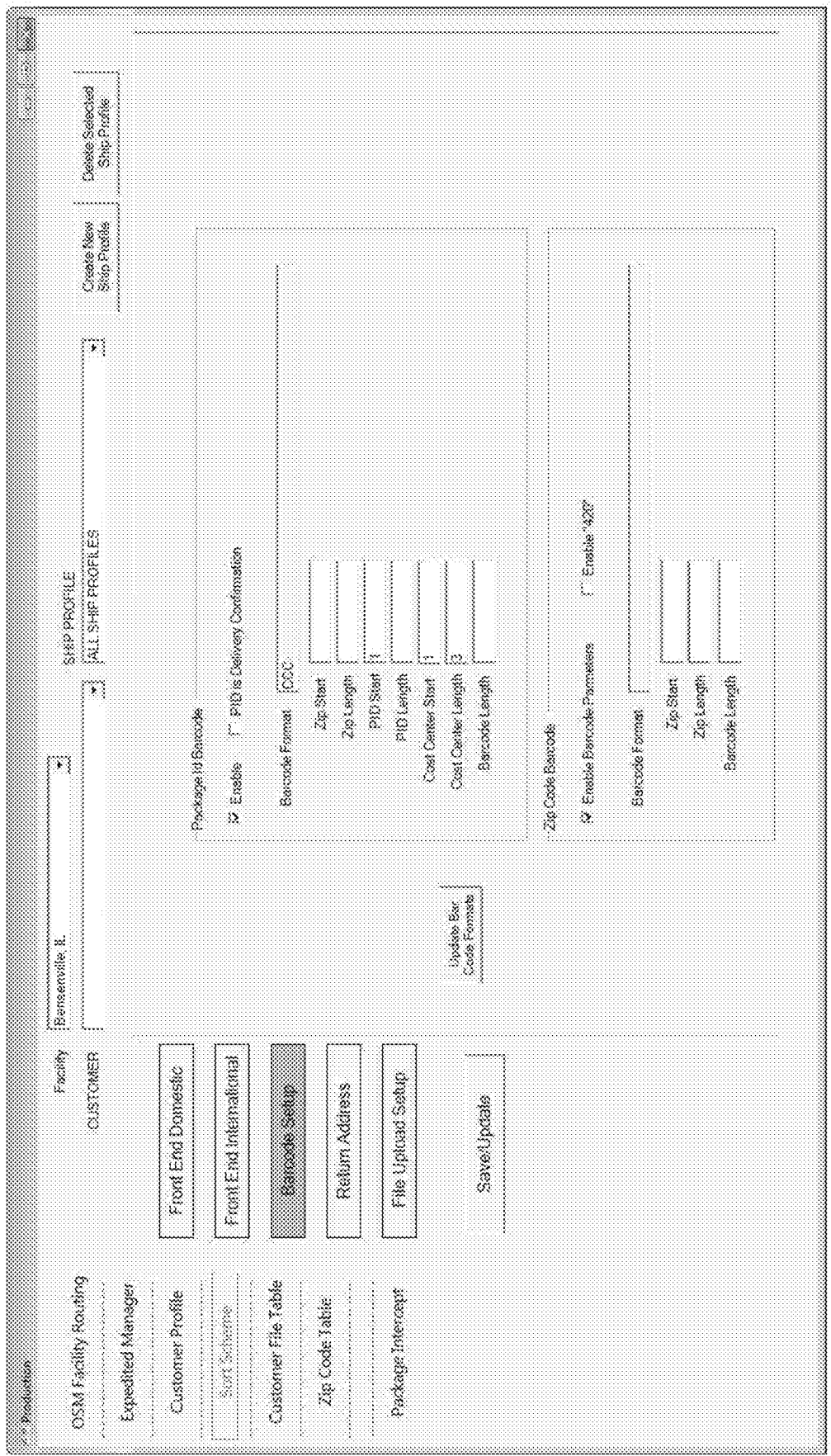
FIG. 21 illustrates an example barcode mapping setup GUI.

Referring to FIG. 21, the main processing unit 102 may use barcode mapping to adapt to numerous different barcode formats. Customers may provide their own bar codes, and the main processing unit 102 may adapt to different bar code standards using mapping. As illustrated, a user may enable barcode mapping and set data structure values that indicate to the main processing unit 102 where in the barcode a zip code begins and the length of the zip code in the barcode, where a package ID begins in the barcode and the length of the package ID in the barcode, and where, if at all, a cost center ID begins in the barcode and the length of the cost center ID in the barcode. If the parcel has a separate barcode for the zip code, the user may also create another data structure informing the main processing unit 102 that a second barcode should be used for determining the parcel's destination zip code. The main processing unit 102 may reference a barcode mapping data structure when analyzing scanned barcode data to determine the package ID, the cost center ID, and the zip code. The barcode may further include a customer ID number. In some embodiments, this customer ID may also be mapped using a similar GUI to the one shown in FIG. 21.

Similar to barcode mapping, the main processing unit 102 may use a data structure to perform customer file mapping. Because customer files may come in various formats, the main processing unit 102 may use the customer file mapping data structure 2200 to map the customer file's format to the main processing unit's 102 required fields for processing a parcel. The customer file mapping data structure 2200 indicates to the main processing unit 102 where in the customer file the required shipping fields are found within the customer file. For example, the customer file sent by customer "1234" may store the customer ID in the first column of the CSV file and the package ID in the second column of the CSV file, whereas customer "5678" may store the customer ID in the second column of the CSV file and the package ID in the first column of the CSV file. It should be understood that the data structure 2200 only illustrates some of the required fields used by the main processing unit 102 to ship a parcel. Additional fields may include a first and last name field, a reference field, a company field, a second address field (for suite/apartment/unit numbers), a city field, a state field, an insurance field, an FTP login and password field, an FTP site address URL field, or any other field. Also, while a CSV file and column number was used to indicate where data is found within the customer file, the customer file mapping data structure 2200 may store other data as well to indicate where in other file types the required information may be found. For example, the customer file mapping data structure 2200 may store where within an CSV or XML, document the information is stored.

Figure 23:
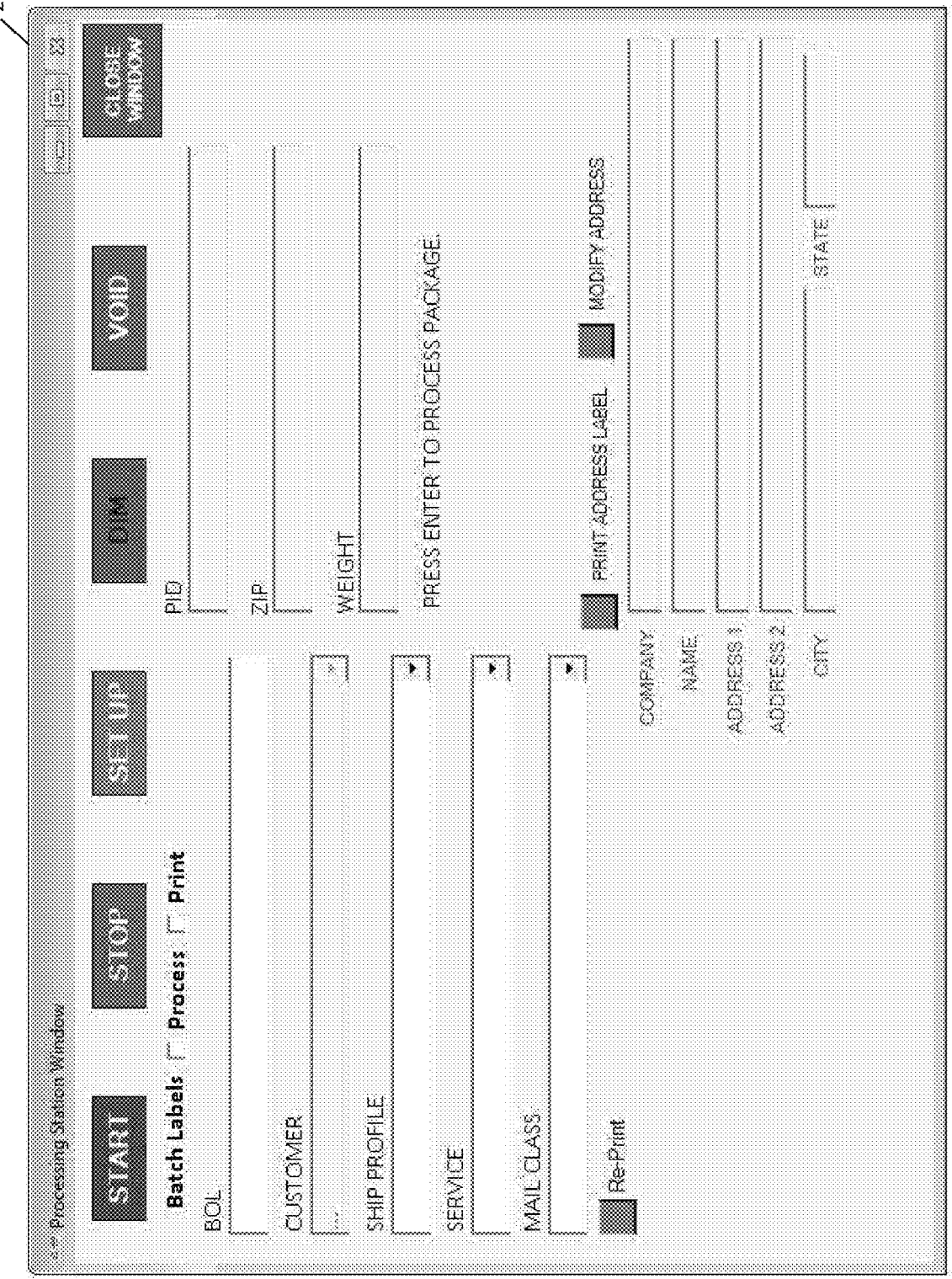
FIG. 23 illustrates an example processing station window GUI.

Finally, FIG. 23 illustrates a processing station GUI 2200 that the production client computer 142 will display while an employee processes parcels through the parcel processing facility 150.

Before a shipment of parcels is scanned on the conveyer system 130, an employee may enter a BOL into the BOL form field, select a ship profile, select a service level, and a mail class. Generally a Bill of Lading (BOL) will be a document that summarizes what the customer is sending. In some embodiments, the parcels may remain stationary during scanning while an employee scans parcel identifiers with a mobile scanner. In the mobile scanner embodiment, the production client computer may report a shipping container to the employee and the employee may physically move the parcel to the identified shipping container. However, because the processing station window 2200 requires a user to select a mail class and a service class for all parcels in the BOL, the third party shipping company may assign multiple BOLs per customer shipment, and a customer file may contain multiple BOLs.

After the user of the production client computer 142 enters the necessary information for the BOL, the scanner 146 scans parcels. The scanner 146 sends the data representing the scanned marker. The scanner 146 may scan a barcode, a QR code, or any other marker. Alternatively, the scanner 146 may be a camera configured to take pictures of a label, and the camera may comprise optical character recognition technology. In either embodiment, the scanner 146 sends data to the main processing unit 102, and the data comprises a parcel ID, a customer ID, and a parcel ID. Alternatively, the scanned data may comprise the cost center ID or a zip code. The data may further comprise a cost center ID. The main processing unit 102 populates many of the fields shown in FIG. 23, such as the PID field, the zip code field and the address. The weight field may be populated after the main processing unit 102 communicates with the scale 149 to receive weight data from the scale 149.

Using the GUI in FIG. 23, the employee may request the main processing unit 102 to start generating labels and ultimately printing labels by instructing the printer 148 to print the generated labels. Before generating a label, the main processing unit 102 has determined that the parcel meets the production customer profile rules. If the parcel is found not to meet the rules set by the production customer profile, the main processing unit 102 will reject the parcel. The main processing unit 102 may send a notification to the production client computer 142 upon rejecting a parcel, or the main processing unit 102 may generate a label that ships the parcel back to the customer using the customer's return address saved in the production customer profile. The rules referenced by the main processing unit 102 include allowed weight classes, allowed service levels, allowed mail classes, whether the parcel ID matches a parcel ID found in the customer file, or any other rule discussed above. All the rules referenced by the main processing unit 102 while generating a label are saved as a data structure in the production customer profile.

While the main processing unit 102 generates a label, the main processing unit 102 receives an indication of the service level and mail class entered into the GUI shown in FIG. 23. However, the main processing unit 102 also verifies that the selected mail class is the most economical way to ship the parcel and still deliver the parcel within the contracted time frame. For example, if the main processing unit 102 finds that the USPS Priority Mail will deliver a parcel within the contracted time frame, but the service level specified by the customer is FedEx Ground, the main processing unit 102 may generate USPS Priority Mail labels to save the third party shipping company money while still meeting customer expectations. In this example, even though the main processing unit 102 generated a USPS Priority Mail label, the main processing unit 102 may bill the customer according to FedEx Ground's rate because the customer agreed to pay for the FedEx Ground rate. As another example, a customer may contract with the third party shipping company to send BPM parcels. However, the USPS does not set rates for BPM parcels under 1 pound. If a customer provides the third party shipping company one or more BPM parcels under one pound and the service selected uses USPS, the main processing unit 102 may determine the most economical mail class is an irregular or machinable parcels mail class. Even though the main processing unit 102 selected machinable parcels or irregular parcels, the customer may still be billed at a 1 pound BPM rate per our agreement with them. In other embodiments, the customer may agree to pay for the most economical rate determined by the main processing unit 102. In this example, the main processing unit 102 bills the customer for the actual selected service level. Even if the customer already has a shipping label, the main processing unit 102 adds its own unique label to the box for mail sorting purposes.

In addition to generating labels, the main processing unit 102 generates a manifest file to be sent to either the USPS or a shipping carrier. The manifest file comprises data that identifies the parcels being given to the USPS or the shipping carrier. The manifest file identifies the weight of each parcel, the service level, and a tracking number or other identification number meaningful to either the USPS or the shipping carrier. The manifest follows the rules specified by either the USPS or the shipping carrier. Further the manifest provides billing data that allows the third party shipping company to pay for the services provided by either the USPS or the shipping carrier. Each shipping carrier has a unique rules regarding file format, file content, and method of transmitting the file. For example, FedEx Ground uses headers for each field to separate them in the file. The USPS has no field markings and relies on the position of the data in the file. The main processing unit 102 stores these rules in the database and applies the rules based on the shipping carrier to which the manifest is being sent. The main processing unit 102 sends the manifest over the WAN to either the USPS system or the shipping carrier system.

Labels may be batch printed if an employee is processing numerous parcels. Batch printing causes the printer 148 to print all the labels for all the processed parcels as one print job rather than individually for each parcel. The main processing unit 102 may also batch process numerous parcels without the need to scan each parcel individually. Batch processing saves time when processing numerous identical parcels, such as when a company sends sample products to many people. When batch processing, the main processing unit 102 generates labels for all the parcels using the customer file as a reference.

Although not illustrated, the GUI 2200 may further display dimensions or allow a user to enter dimensions. Not all customers are billed dimensionally, so the screen may populate differently depending on which customer's parcels are being processed.

In addition to generating labels and a manifest, the main processing unit 102 controls the sorting of parcels into containers that are given to the USPS or a shipping carrier. The containers are freight, but they move at priority mail speed. The containers are then delivered by the third party shipping company to a local post office, the post office accepts the container, and delivers the parcels according to normal post office protocol. Thus, the main processing unit 102 must sort the parcels into shipping containers that are sent to regional distribution centers or to individual post offices.

Figure 24:
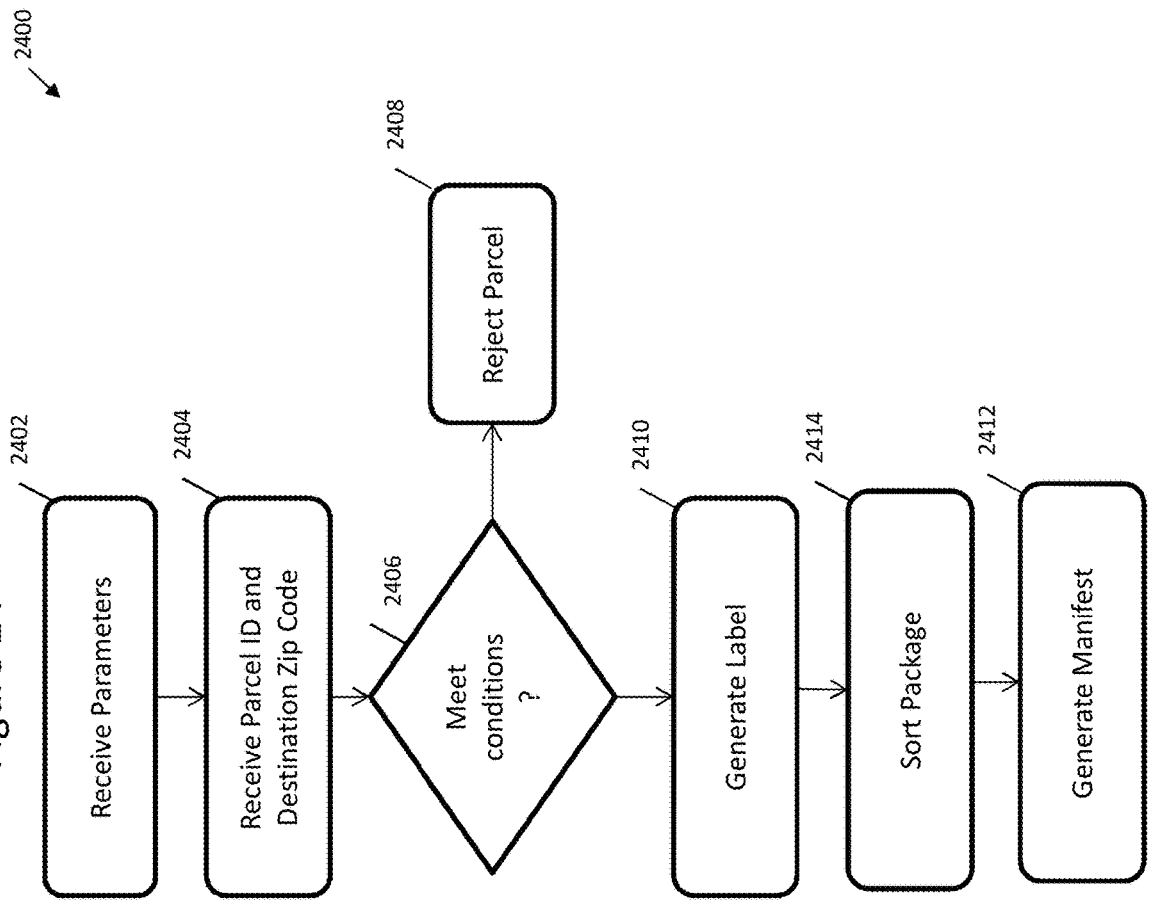
FIG. 24 illustrates an example method implemented by the main processing unit that makes decisions regarding parcels moving through a parcel processing facility.

FIG. 24 illustrates this basic process 2400. The main processing unit 102 receives parameters for the BOL (step 2402), and the main processing unit 102 further receives data indicating the parcel's ID and the parcel's destination zip code (step 2404). The main processing unit 102 references the customer file and the customer profile to determine that the parcel can be processed (step 2406). If the parcel cannot be processed, such as because the parcel is too heavy, the main processing unit 102 rejects the parcel (step 2408). If the parcel meets the conditions set by the production customer profile, the main processing unit 102 generates a label and instructs the printer 148 to print a label (step 2410), which may include determining that the service method will deliver to the destination address in time or determining the most economical method of shipping the parcel to the destination address in time. The main processing unit 102 generates a manifest (step 2412), and finally the main processing unit 102 controls the sorting of the parcel into a container (2414).

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described example embodiments, but should be defined only in accordance with the following claims appended hereto and their equivalents.

What is claimed is:

1. A system for processing a plurality of parcels and which adaptively accommodates different encoding formats for machine-readable indicia via mapping, the parcels including a plurality of scannable parcel identifiers thereon, the system comprising:
    a scanner configured to a scan machine-readable indicia on the parcels to generate scanned machine-readable indicia data, wherein the machine-readable indicia encodes destination zip codes and the parcel identifiers for the parcels;
    a database configured to store a plurality of customer profile data structures, each customer profile data structure for association with a customer, wherein each of a plurality of the customer profile data structures sets a plurality of rules for parcels to be shipped on behalf of its associated customer, the database further configured to store a plurality of mapping data structures that identify how parcel identifiers and destination zip codes are encoded in a plurality of different encoding formats for the machine-readable indicia, wherein the mapping data structures comprise data specifying lengths and start values where the parcel identifiers and destination zip codes are found in scanned machine-readable indicia data for the different encoding formats; and
    a computer processor for cooperation with the scanner and the database, the computer processor configured to:
        translate the scanned machine-readable indicia data into decoded parcel identifiers and destination zip codes based on the mapping data structures using the data from the mapping data structures that specifies lengths and start values where the parcel identifiers and destination zip codes are found in the scanned machine-readable indicia; and
        for each decoded parcel identifier, (1) apply the rules from the customer profile data structures in the database that are applicable to the parcel corresponding to the decoded parcel identifier and (2) generate shipping label data for the parcel corresponding to the decoded parcel identifier that defines shipping and handling for the parcel that is compliance with the applied rules.

2. The system of claim 1 wherein the computer processor is further configured to:
    for each decoded parcel identifier, (1) determine a destination for the parcel corresponding to that parcel identifier based on the decoded destination zip code for the corresponding parcel, (2) determine a delivery time frame for shipping the corresponding parcel, and (3) determine based on the applied rules whether the determined destination and delivery time frame are in compliance with the rules.

3. The system of claim 2 wherein the computer processor is further configured to:
    for each decoded parcel identifier, (1) determine a customer associated with the corresponding parcel, (2) retrieve from the database the customer profile data structure associated with the determined customer, (3) determine whether the corresponding parcel is in compliance with the rules set by the retrieved customer profile data structure as applied to data about the corresponding parcel including the determined destination and the determined delivery time frame, and (4) in response to a determination that the corresponding parcel is in compliance with the rules set by the retrieved customer profile data structure, generate the shipping label data for the corresponding parcel based on the determined destination, the determined delivery time frame, and data within the retrieved customer profile data structure.

4. The system of claim 3 wherein each of a plurality of the customer profile data structures comprises data indicative of a plurality of permitted shipping service levels for its associated customer, and wherein the rules include rules configured to identify for selection which of the permitted shipping service levels is estimated to deliver the corresponding parcel to the determined destination within the determined delivery time frame at the lowest monetary cost;
 wherein the computer processor is further configured to select a permitted shipping service level from the retrieved customer profile data structure based on the rules as applied to the determined destination and the determined delivery time frame; and
 wherein the computer processor is further configured to generate the shipping label data for the parcel corresponding to the parcel identifier based on the identified and selected permitting shipping service level.

5. The system of claim 1 wherein the computer processor is further configured to (1) determine a permitted shipping service level based on the applied rules and (2) determine, based on the determined permitted shipping service level, a shipping container from among a plurality of shipping containers that the corresponding parcel is to be sorted into.

6. The system of claim 5 further comprising:
 a conveyer system configured to move the parcels into any of a plurality of shipping containers, the conveyer system including at least one mechanical sorter under control of the computer processor to selectively sort the parcels for movement into selected ones of the shipping containers based on the determined shipping container; and
 wherein the computer processor is further configured to provide control instructions for the mechanical sorter based on the determined shipping container.

7. The system of claim 5 wherein the scanner is a mobile scanner in communication with the computer processor, the mobile scanner having a screen for displaying information to an employee;
 wherein the computer processor is further configured to send a message to the mobile scanner indicating the determined shipping container; and
 wherein the mobile scanner is configured to display the message received from the computer processor to the employee through the mobile scanner's screen.

8. The system of claim 1 wherein the rules include a rule that defines allowed parcel sizes for parcels.

9. The system of claim 8 wherein the computer processor is further configured to:
 receive data indicative of parcel size; and
 apply the received parcel size data to the allowed parcel sizes rule to determine whether the received parcel size is permitted.

10. The system of claim 1 wherein the rules include a rule that checks whether the decoded parcel identifier matches a parcel identifier in a customer file for a customer corresponding to the parcel.

11. The system of claim 1 wherein the machine-readable indicia comprises a bar code, the bar code comprising encoded data that includes the parcel identifier and the destination zip code, wherein the scanned machine-readable indicia data comprises scanned bar code data, wherein the mapping data structures are part of the customer profile data structures such that each of a plurality of the customer profile data structures includes an associated mapping data structure, and wherein the mapping data structures comprise data specifying the lengths and start values within the scanned bar code data where the parcel identifiers and destination zip codes are to be found for parcels of customers associated with the customer profile data structures corresponding to the mapping data structures; and
 wherein the computer processor is further configured to decode the encoded parcel identifiers and destination zip codes in the scanned bar code data based on the specifications of the mapping data structures in the customer profile data structures.

12. The system of claim 1 wherein the machine-readable indicia comprises a QR code, the QR code comprising encoded data that includes the parcel identifier and the destination zip code, wherein the scanned machine-readable indicia data comprises scanned QR code data, wherein the mapping data structures are part of the customer profile data structures such that each of a plurality of the customer profile data structures includes an associated mapping data structure, and wherein the mapping data structures comprise data specifying the lengths and start values within the scanned QR code data where the parcel identifiers and destination zip codes are to be found for parcels of customers associated with the customer profile data structures corresponding to that mapping data structures; and
 wherein the computer processor is further configured to decode the encoded parcel identifiers and destination zip codes in the scanned QR code data based on the specifications of the mapping data structures in the customer profile data structures.

13. The system of claim 1 wherein the computer processor is further configured to generate a manifest file that identifies the corresponding parcel.

14. The system of claim 13 wherein the computer processor is further configured to (1) select a format for the manifest file based on a shipping carrier for the corresponding parcel and (2) generate the manifest file according to the selected format.

15. The system of claim 1 further comprising a printer configured to print a shipping label for the parcel based on the generated shipping label data.

16. The system of claim 1 wherein the computer processor comprises a plurality of processors.

17. A system for processing a plurality of parcels, the parcels including a plurality of scannable parcel identifiers thereon, the system comprising:
 a scanner configured to a scan machine-readable indicia on the parcels to generate scanned machine-readable indicia data, wherein the machine-readable indicia encodes destination zip codes and the parcel identifiers for the parcels;
 a database configured to store a plurality of customer profile data structures, each customer profile data structure for association with a customer, wherein each of a plurality of the customer profile data structures (1) comprises data indicative of a plurality of permitted shipping service levels for its associated customer and (2) sets a plurality of rules for parcels to be shipped on behalf of its associated customer; and
 a computer processor for cooperation with the scanner and the database, the computer processor configured to:

translate the scanned machine-readable indicia data from the scanner into decoded parcel identifiers and destination zip codes based on a mapping data structure that specifies lengths and start values where the parcel identifiers and destination zip codes are found in the scanned machine-readable indicia data; and for each decoded parcel identifier, (1) apply the rules from the customer profile data structures in the database that are applicable to the parcel corresponding to the decoded parcel identifier, (2) select a permitted shipping service level for the parcel based on the applied rules, and (3) determine, based on the selected permitted shipping service level, a shipping container from among a plurality of shipping containers that the corresponding parcel is to be sorted into.

18. The system of claim 17 wherein the computer processor is further configured to:

for each decoded parcel identifier, (1) determine a destination for the parcel corresponding to that parcel identifier based on the decoded destination zip code for the parcel associated with that parcel identifier, (2) determine a delivery time frame for shipping the corresponding parcel, (3) determine a customer associated with the corresponding parcel, (4) retrieve from the database the customer profile data structure associated with the determined customer, wherein the retrieved customer profile data structure further comprises rules configured to identify for selection which of the permitted shipping service levels is estimated to deliver the corresponding parcel to the determined destination within the determined delivery time frame at the lowest monetary cost, (5) determine whether the corresponding parcel is in compliance with the rules set by the retrieved customer profile data structure as applied to data about the corresponding parcel including the determined destination and the determined delivery time frame, (6) select the permitted shipping service level from the retrieved customer profile data structure based on the rules as applied to the determined destination and the determined delivery time frame, (7) in response to a determination that the corresponding parcel is in compliance with the rules set by the retrieved customer profile data structure, generate shipping label data for the corresponding parcel, and (8) determine, based on the selected permitted shipping service level, the shipping container from among the plurality of shipping containers that the corresponding parcel is to be sorted into.

19. The system of claim 17 further comprising:

a conveyer system configured to move the parcels into any of a plurality of shipping containers, the conveyer system including at least one mechanical sorter under control of the computer processor to selectively sort the parcels for movement into selected ones of the shipping containers based on the determined shipping container; and wherein the computer processor is further configured to provide control instructions for the mechanical sorter based on the determined shipping container.

20. The system of claim 17 wherein the scanner is a mobile scanner in communication with the computer processor, the mobile scanner having a screen for displaying information to an employee;

wherein the computer processor is further configured to send a message to the mobile scanner indicating the determined shipping container; and wherein the mobile scanner is configured to display the message received from the computer processor to the employee through the mobile scanner's screen.

* * * * *